US012631996B2

(12) United States Patent
Matsuda

(10) Patent No.: US 12,631,996 B2
(45) Date of Patent: May 19, 2026

(54) DRIVE TRANSMITTER, DRIVE DEVICE, AND IMAGE FORMING APPARATUS

(71) Applicant: Naoki Matsuda, Kanagawa (JP)

(72) Inventor: Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/800,455

(22) Filed: Aug. 12, 2024

(65) Prior Publication Data

US 2025/0085654 A1 Mar. 13, 2025

(30) Foreign Application Priority Data

Sep. 11, 2023 (JP) ................................ 2023-147176
May 27, 2024 (JP) ................................ 2024-085865

(51) Int. Cl.
*G03G 15/00* (2006.01)
*G03G 15/08* (2006.01)

(52) U.S. Cl.
CPC ..... *G03G 15/5004* (2013.01); *G03G 15/0889* (2013.01); *G03G 15/0891* (2013.01); *G03G 15/757* (2013.01); *G03G 15/80* (2013.01)

(58) Field of Classification Search
CPC ........... G03G 15/5004; G03G 15/0889; G03G 15/0891; G03G 15/757; G03G 15/80
See application file for complete search history.

(56) References Cited

U.S. PATENT DOCUMENTS

2005/0117919 A1* 6/2005 Ito ...................... G03G 15/0889 399/258
2016/0085178 A1* 3/2016 Kawasumi ......... G03G 15/0882 399/106

FOREIGN PATENT DOCUMENTS

JP 7-219410 A 8/1995
JP 2017-083006 A 5/2017

* cited by examiner

*Primary Examiner* — Sandra Brase
(74) *Attorney, Agent, or Firm* — Harness, Dickey & Pierce, P.L.C.

(57) ABSTRACT

An image forming apparatus includes a developing device, a drive source, an electromagnetic clutch, and circuitry. The developing device includes a developer and a rotator to convey or stir the developer. The drive source generates a driving force to drive the rotator. The electromagnetic clutch transmits the driving force of the drive source to the rotator of the developing device. The circuitry controls current to be supplied to the electromagnetic clutch and changes a value of the current supplied to the electromagnetic clutch in accordance with a fluidity of the developer in the developing device.

19 Claims, 10 Drawing Sheets

DRIVE TRANSMITTER, DRIVE DEVICE, AND IMAGE FORMING APPARATUS

CROSS-REFERENCE TO RELATED APPLICATIONS

This patent application is based on and claims priority pursuant to 35 U.S.C. § 119 (a) to Japanese Patent Application Nos. 2023-147176, filed on Sep. 11, 2023 and 2024-085865, filed on May 27, 2024 in the Japan Patent Office, the entire disclosure of which is hereby incorporated by reference herein.

BACKGROUND

Technical Field

Embodiments of the present disclosure relate to a drive transmitter, a drive device, and an image forming apparatus.

Related Art

A drive transmitter is known that includes an electromagnetic clutch and transmits the driving force of a driving source to rotators of a developing device. Such a drive transmitter transmits the driving force of a drive motor as the driving source to developing rollers as the rotators of the developing device and a developer supply member.

SUMMARY

In an embodiment of the present disclosure, an image forming apparatus includes a developing device, a drive source, an electromagnetic clutch, and circuitry. The developing device includes a developer and a rotator to convey or stir the developer. The drive source generates a driving force to drive the rotator. The electromagnetic clutch transmits the driving force of the drive source to the rotator of the developing device. The circuitry controls current to be supplied to the electromagnetic clutch and changes a value of the current supplied to the electromagnetic clutch in accordance with a fluidity of the developer in the developing device.

In another embodiment of the present disclosure, an image forming apparatus includes a developing device, a drive source, an electromagnetic clutch, a winder, a drive transmission device, and circuitry. The developing device includes a developer and a rotator to convey or stir the developer. The drive source generates a driving force to drive the rotator. The electromagnetic clutch transmits the driving force of the drive source to the rotator of the developing device. The winder winds a protection sheet in the developing device. The drive transmission device transmits, via the electromagnetic clutch, the driving force of the drive source to the winder to wind the protection sheet. The circuitry sets a first value of a current supplied to the electromagnetic clutch during a developing operation of the developing device and sets a second value of the current supplied to the electromagnetic clutch when the winder winds the protection sheet. The second value is larger than the first value.

In still another embodiment of the present disclosure, an image forming apparatus includes an electromagnetic clutch including an electromagnetic coil, a drive source, a helical gear, and circuitry. The drive source drives the electromagnetic clutch. The helical gear is coaxial with the electromagnetic clutch and assembled to the electromagnetic clutch. The helical gear generates a thrust force to move the helical gear toward the electromagnetic coil of the electromagnetic clutch. The circuitry gradually changes the value of the current supplied to the electromagnetic clutch when the electromagnetic clutch is switched between on and off.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
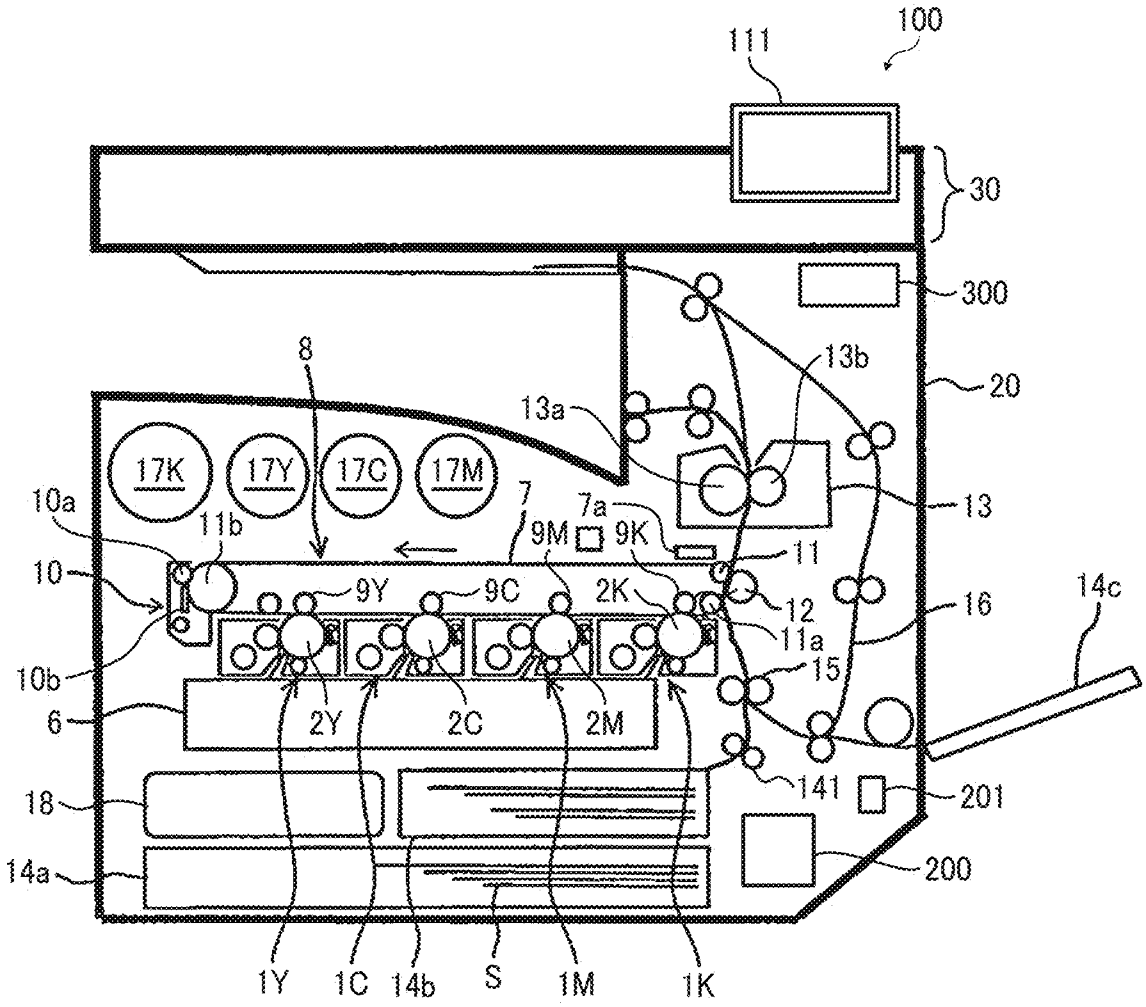
FIG. 1 is a diagram illustrating a schematic configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions below are given of a drive transmission device, a drive device, and an image forming apparatus, according to embodiments of the present disclosure, with reference to the accompanying drawings. It is to be understood that those skilled in the art can easily modify and change the present disclosure within the scope of the appended claims to form other embodiments, and these modifications and changes are included in the scope of the appended claims. The above-described embodiments are illustrative and do not limit the present disclosure.

FIG. 1 is a diagram illustrating a schematic configuration of an image forming apparatus 100 according to an embodiment of the present disclosure.

The image forming apparatus 100 includes a printer 20 as an image forming device and an image reader 30.

The printer 20 of the image forming apparatus 100 includes four image forming devices 1Y, 1C, 1M, and 1K to form toner images of yellow (Y), cyan (C), magenta (M), and black (K), respectively. The suffixes Y, C, M, and K that are attached to the ends of the reference numerals of the image forming devices 1Y, 1C, 1M, and 1K indicate that the image forming devices 1Y, 1C, 1M, and 1K form toner images of yellow, cyan, magenta, and black, respectively. The order of colors Y, C, M, and K is not limited to the order illustrated in FIG. 1 and may be another order.

Figure 2:
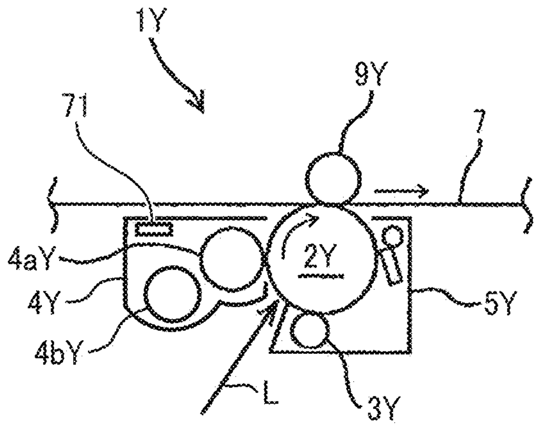
FIG. 2 is a diagram illustrating a configuration of an image forming device for yellow color among four image forming devices, according to an embodiment of the present disclosure.

FIG. 2 is a diagram illustrating a configuration of the image forming device 1Y for yellow among the four image forming devices 1Y, 1C, 1M, and 1K. In FIG. 2, the image forming device 1Y includes a drum-shaped photoconductor 2Y as a latent-image bearer, and a charging roller 3Y as a charger, a developing device 4Y as a developer, and a cleaner 5Y, all of which are disposed around the photoconductor 2Y. The charging roller 3Y that is formed of a rubber roller rotates while being in contact with the photoconductor 2Y. A direct current (DC) bias that does not include an alternating current (AC) element or a superimposed bias that includes AC and DC is applied to the charging roller 3Y as a charging bias. By so doing, electric discharge is generated between the charging roller 2Y which rotates in the clockwise direction in FIG. 2 and the photoconductor 2Y. Accordingly, a circumferential surface of the photoconductor 2Y that contacts a circumferential surface of the charging roller 3Y is uniformly charged to a similar polarity as the normal charging polarity of toner. The charging roller 3Y may be another type of charging roller such as a non-contact charging roller.

The developing device 4Y contains a developer G containing toner of yellow and magnetic carrier. The developing device 4Y includes, for example, a developing roller 4*a*Y as a developer bearer opposed to the photoconductor 2, a developer screw 4*b*Y to convey and stir the developer G, and a toner concentration sensor. The developing roller 4*a* Y includes a hollow rotatable sleeve, a magnet roller which is contained in the sleeve so as not to rotate together with the sleeve.

The image forming device 1Y is a process cartridge in which, for example, the photoconductor 2Y, the charging roller 3Y, the developing device 4Y, and the cleaner 5Y arranged around the photoconductor 2Y are held as one unit in a casing 1*a* of an image forming device 1 to be described below. The image forming device 1Y is removably attached to the body of the printer 20. Accordingly, consumable parts of the image forming device 1Y can be replaced at once when the operational life of the consumable parts is reached. The developing device 4 includes an integrated circuit (IC) chip 71 that stores usage data of the developing device 4. The image forming devices 1C, 1M, and 1K for the colors of cyan, magenta, and black, respectively, each has a similar configuration as the image forming device 1Y for color of yellow except that the colors of the toners employed are different. Thus, the description of the image forming devices 1C, 1M, and 1K is omitted.

In FIG. 1, an optical writing device 6 that serves as a latent-image writer is disposed below the image forming devices 1Y, 1C, 1M, and 1K. The optical writing device 6 includes, for example, light sources, a polygon mirror, an f-θ lens, and a reflection mirror. The optical writing device 6 optically scans uniformly charged surfaces of the photoconductors 2Y, 2C, 2M, and 2K for the respective colors with laser light L. The optical scanning as described above allows electrostatic latent images of yellow, cyan, magenta, and black to be formed on the photoconductors 2Y, 2C, 2M, and 2K, respectively.

In FIG. 2, an electrostatic latent image of yellow formed on the surface of the photoconductor 2Y passes through a position facing the developing device 4Y as the photoconductor 2Y rotates. At this time, a developing electric field is formed between the developing sleeve of the developing roller 4*a* Y to which the developing bias is applied and the electrostatic latent image on the photoconductor 2Y. The developing electric field provides a developing potential to move the toner from the developing sleeve to the electrostatic latent image.

By contrast, a non-developing electric field is formed between the developing sleeve and a background surface, i.e., a uniformly charged surface, of the photoconductor 2Y. The non-developing electric field provides a background potential to press the toner against the surface of the developing sleeve. When the electrostatic latent image on the photoconductor 2Y passes through a position facing the developing device 4Y, the toner of yellow is attached to electrostatic latent image on the photoconductor 2Y by the action of the developing potential. Thus, a toner image of yellow is formed on the photoconductor 2Y.

In FIG. 1, the electrostatic latent images for magenta, cyan, and black color formed on the circumferential surfaces of the photoconductors 2M, 2C, and 2K, respectively, are also developed into toner images of magenta, cyan, and black by a similar process as that of the image forming device 1Y of yellow. The electric potential of the background surfaces of the photoconductors 2Y, 2M, 2C, and 2K, the electric potential of the electrostatic latent images on the circumferential surfaces of the photoconductors 2Y, 2M, 2C, and 2K, and the developing bias have a negative polarity in similar to the normal charging polarity of the toner. The absolute value of the potential of the background surfaces of the photoconductors 2Y, 2M, 2C, and 2K is larger than the absolute value of the potential of the electrostatic latent images. The absolute value of the developing bias is a value between the above-described two absolute values, i.e., the absolute value of the potential of the background surfaces of the photoconductors 2Y, 2M, 2C, and 2K and the absolute value of the potential of the electrostatic latent images.

An intermediate transfer device 8 that transfers the toner images from the photoconductor 2Y, 2C, 2M, and 2K to a recording sheet S via the intermediate transfer belt 7 is disposed above the image forming devices 1Y, 1C, 1M, and 1K. The intermediate transfer belt 7 is endlessly moved in a counterclockwise direction in FIG. 1 by rotational driving of at least one of a secondary-transfer backup roller 11 and intermediate transfer belt driving rollers 11*a*, and 11*b*, while being stretched over the secondary-transfer backup roller 11 and the intermediate transfer belt driving rollers 11*a* and 11*b*. In addition to the intermediate transfer belt 7, the intermediate transfer device 8 includes, for example, primary transfer rollers 9Y, 9C, 9M, and 9K, a brush roller 10*a*, a belt cleaner 10 including a cleaning blade 10*b*, the secondary-transfer backup roller 11, and an optical sensor unit 7*a*.

The intermediate transfer belt 7 is interposed between the primary transfer rollers 9Y, 9C, 9M, and 9K and the photoconductors 2Y, 2C, 2M, and 2K, respectively. In so doing, primary transfer nips for Y, M, C, and K are formed at which the front surface of the intermediate transfer belt 7 contacts the photoconductors 2Y, 2M, 2C, and 2K. The intermediate transfer device 8 includes a secondary transfer roller 12 downstream from the image forming device 1K for black in a direction in which the intermediate transfer belt 7 moves and outside the loop of the intermediate transfer belt 7 in the vicinity of the secondary-transfer backup roller 11. The intermediate transfer belt 7 is interposed between the secondary transfer roller 12 and the secondary-transfer backup roller 11 to form a secondary transfer nip.

Above the secondary transfer roller 12, a fixing device 13 is disposed. The fixing device 13 includes a fixing roller 13*a* and a pressure roller 13*b* that contact each other while rotating to form a fixing nip. The fixing roller 13*a* includes a halogen heater. A power source supplies power to the halogen heater such that the temperature of the surface of the fixing roller 13*a* is a predetermined temperature. Accordingly, the fixing nip is formed between the fixing roller 13*a* and the pressure roller 13*b*.

In a lower portion of the printer 20, sheet trays 14*a* and 14*b*, a sheet feeding roller pair 141, and a registration roller pair 15 are disposed. The sheet trays 14*a* and 14*b* store multiple recording sheets S, which are recording media on which images are to be recorded, in a stacked manner. A bypass feed tray 14*c* from which a sheet S is manually fed from a lateral side of the printer 20 is disposed on the lateral side of the printer 20. A duplex unit 16 is disposed on the right side of the intermediate transfer device 8 and the fixing device 13 in FIG. 1. The duplex unit 16 conveys a recording sheet S to the secondary transfer nip again when duplex printing is performed.

Toner supply containers 17Y, 17C, 17M, and 17K that supply toner to the developing devices 4Y, 4C, 4M, and 4K of the image forming devices 1Y, 1C, 1M, and 1K, respectively, are arranged in an upper portion of the printer 20. On the left side of a sheet tray 14*b* in FIG. 1, a waste toner container 18 is disposed to accommodate waste toner removed by the cleaners 5Y, 5C, 5M, and 5K of the image forming devices 1Y, 1C, 1M, and 1K, respectively, and waste toner removed by the belt cleaner 10. The printer 20 also includes a power supply unit 200, and a controller 300 as a controller.

Figure 16:
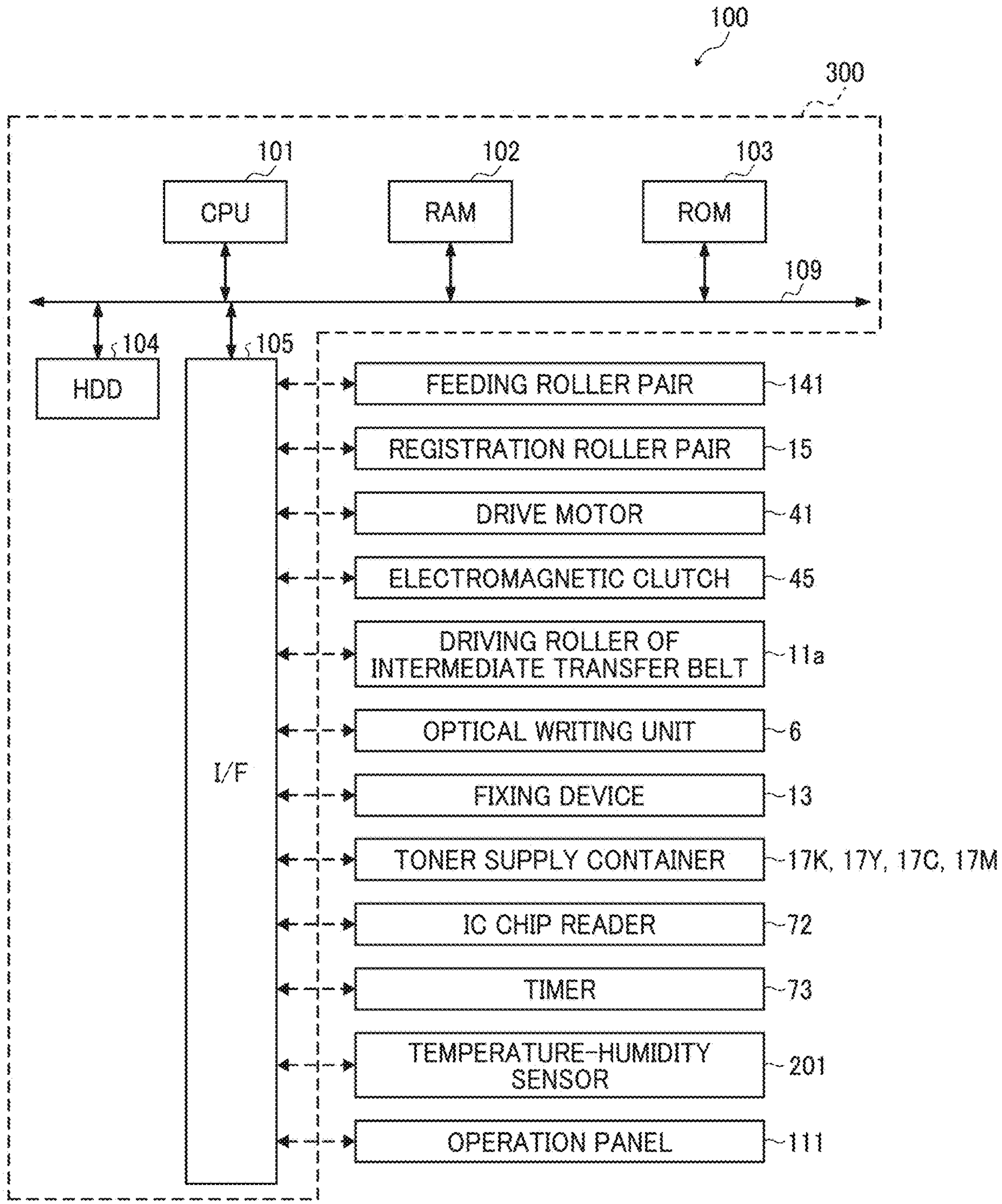
FIG. 16 is a block diagram of a hardware configuration diagram to control an image forming apparatus, according to an embodiment of the present disclosure.

Next, a description is given of a control block configuration of the image forming apparatus 100 with reference to FIG. 16. FIG. 16 is a block diagram of a hardware configuration to perform control processing of the image forming apparatus 100. As illustrated in FIG. 16, the image forming apparatus 100 includes a central processing unit (CPU) 101, a random access memory (RAM) 102, a read only memory (ROM) 103, a hard disk drive (HDD) 104, and an interface (I/F) 105 connected to each other via a common bus 109.

The CPU 101 is an arithmetic unit and controls the entire operation of the image forming apparatus 100. The RAM 102 is a volatile storage medium capable of reading and writing data at high speed and is employed as a work area when the CPU 101 processes data. The ROM 103 is a read-only non-volatile storage medium that stores programs such as firmware. The HDD 104 is a non-volatile storage medium that allows data to be read and written and has a relatively large storage capacity. The HDD 104 stores, e.g., an operating system (OS), various control programs, and application programs.

The image forming apparatus 100 processes programs, by an arithmetic function of the CPU 101, such as a control program stored in the ROM 103, a data-processing program, which is an application program, loaded into the RAM 102 from a recording medium such as the HDD 104. Such processing as described above is performed by a software controller that includes various functional modules of the image forming apparatus 100. A functional block that implements the functions of the image forming apparatus 100 includes a combination of the software controller as described above and the hardware resources installed in the image forming apparatus 100. In other words, the controller 300 that controls the operation of the image forming apparatus 100 includes the CPU 101, the RAM 102, the ROM 103, the HDD 104, and the I/F 105. The controller 300 also functions as a pulse width modulation (PWM) controller 61 described below.

The I/F 105 connects a sheet feeding roller pair 141, the registration roller pair 15, a drive motor 41 for driving a developing screw 4*b* and a developing roller 4*a*, an electromagnetic clutch 45, the intermediate transfer belt drive roller 11*b*, an optical writing device 6, the fixing device 13, the toner supply containers 17K, 17Y, 17C, and 17M, an IC-chip reader 72, a timer 73, a temperature-humidity sensor 201, and an operation panel 111, to the common bus 109.

The controller 300 controls, via the I/F 105, the operations of the sheet feeding roller pair 141, the registration roller pair 15, the drive motor 41, the electromagnetic clutch 45, the intermediate transfer belt driving roller 11*b*, the optical writing device 6, the fixing device 13, and the toner supply containers 17K, 17Y, 17C, and 17M. The controller 300 acquires, via the I/F 105, various kinds of data from the IC-chip reader 72, the timer 73, the temperature-humidity sensor 201, and the operation panel 111.

Next, a description is given of the operation of the printer 20. First, the circumferential surface of the photoconductor 3Y is uniformly charged in an area in which the photoconductor 3Y contacts the charging roller 3Y, to which charging bias output from a charging power supply unit is applied, and the photoconductors 2Y. The optical writing device 6 scans the circumferential surface of the photoconductor 2Y charged to a predetermined potential with the laser light L. By so doing, an electrostatic latent image is written on the circumferential surface of the photoconductor 2Y. When the photoconductor 2Y that bears the electrostatic latent image reaches the developing device 4Y as the photoconductor 2Y rotates, the developing roller 4*a* Y disposed opposite the photoconductor 2Y supplies Y toner to the electrostatic latent image on the photoconductor 2Y. Accordingly, a toner image of yellow is formed on the photoconductor 2Y. The controller 300 performs toner supply control such that an appropriate amount of the Y toner is supplied from the toner supply container 17Y into the developing device 4Y.

An operation similar to the above-described operation is also performed at a predetermined timing in the image forming devices 1C, 1M, and 1K. Accordingly, toner images of yellow, cyan, magenta, and black (Y, C, M, and K) are formed on the surfaces of the photoconductors 2Y, 2C, 2M, and 2K, respectively. The toner images of yellow, cyan, magenta, and black are sequentially superimposed and primarily transferred onto the front surface of the intermediate transfer belt 7 at primary transfer nips for Y, C, M, and K, respectively. A primary transfer bias of a positive polarity opposite to the normal charging polarity of the toners of yellow, cyan, magenta, and black is applied to the primary transfer rollers 9Y, 9C, 9M, and 9K by a transfer power supply.

In FIG. 2, the photoconductor 2Y that has passed through the primary transfer nip for yellow has residual toner, which has not been transferred to the intermediate transfer belt 7, attached onto the circumferential surface of the photoconductor 2Y. The transfer residual toner is scraped off from the circumferential surface of the photoconductor 2Y by the cleaning blade of the cleaner 5Y.

In FIG. 1, a recording sheet S is conveyed from any one of the sheet trays 14*a* and 14*b* or the bypass feed tray 14*c* and is stopped once when the recording sheet S reaches the registration roller pair 15. Subsequently, the registration roller pair 15 rotates in accordance with a predetermined timing to send the recording sheet S toward the secondary transfer nip.

The toner images of yellow, cyan, magenta, and black that are superimposed on the intermediate transfer belt 7 are secondarily transferred to the recording sheet S at the secondary transfer nip at which the secondary transfer roller 12 and the intermediate transfer belt 7 contact each other. A secondary transfer bias that has a negative polarity similar to the normal charging polarity of the toner output from a secondary transfer power source is applied to the secondary-transfer backup roller 11 that sandwiches the intermediate transfer belt 7 with the secondary transfer roller 12.

Transfer residual toner that has not been secondarily transferred to the recording sheet S adheres to the surface of the intermediate transfer belt 7 that has passed through the secondary transfer nip. The transfer residual toner is scraped off from the surface of the intermediate transfer belt 7 by the belt cleaner 10.

After the recording sheet S passes through the secondary transfer nip, the recording sheet S is conveyed toward the fixing device 13 and is nipped into the fixing nip. The toner image on the recording sheet S is heated and fixed by heat and pressure from the fixing roller 13*a* and the pressure roller 13*b* at the fixing nip. When single-sided printing is performed, a recording sheet S on which the toner image has been fixed is ejected to the outside of the image forming apparatus 100 by conveyance rollers. When double-sided printing is performed, a recording sheet S is conveyed to the duplex unit 16 by the conveyance rollers. Subsequently, the recording sheet S is reversed and ejected to the outside of the image forming apparatus 100 after an image has been formed on a side of the recording sheet S, opposite to the side on which the image has been formed as described above.

Figure 3:
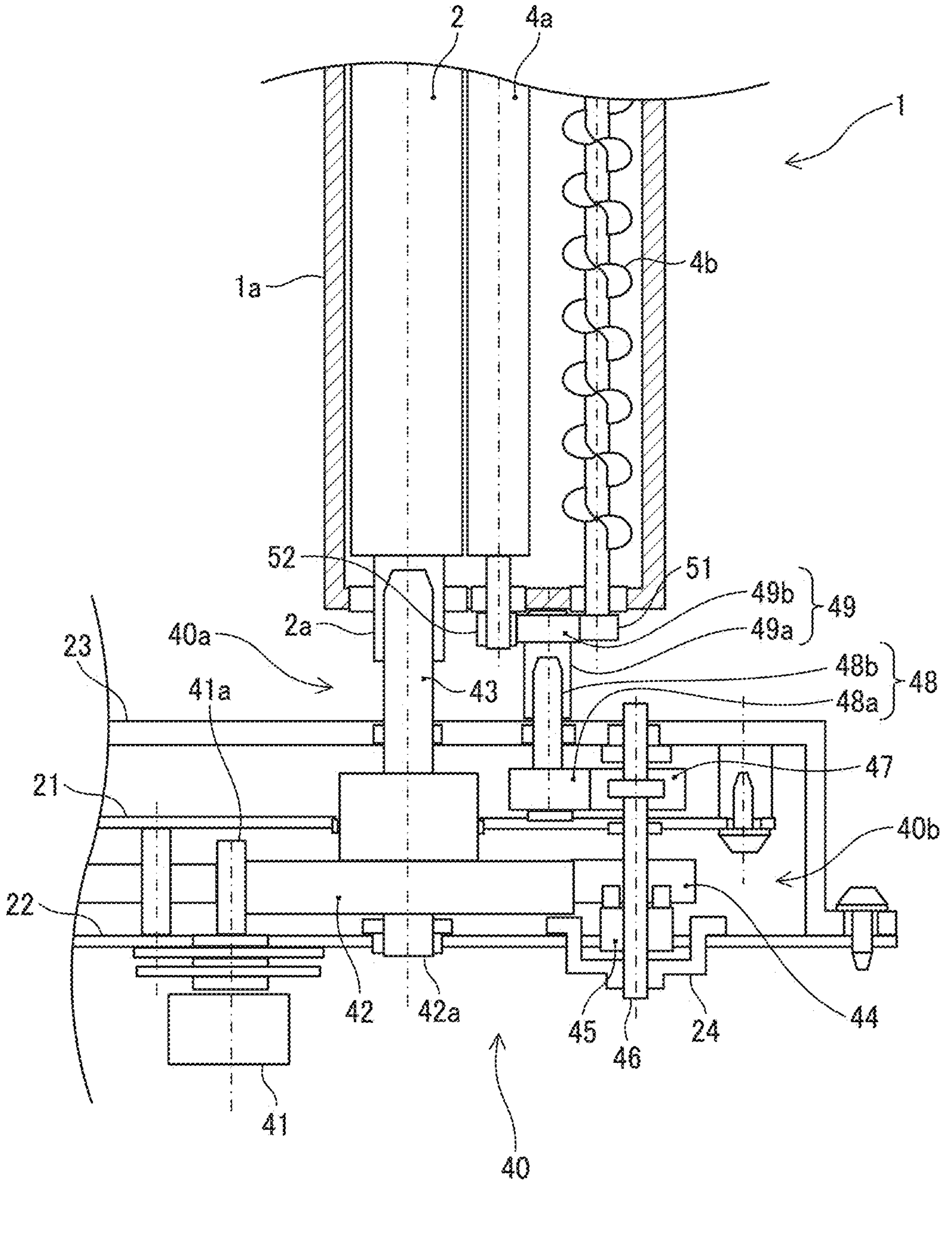
FIG. 3 is a cross-sectional view of a photoconductor and a driving device that drives a developing screw and the developing roller that are rotators of the developing device, according to an embodiment of the present disclosure.

FIG. 3 is a cross-sectional view of a photoconductor 2, as an example of the photoconductors 2Y, 2C, 2M, and 2K, of the image forming device 1 and a driving device 40 that drives the developing screw 4*b* and the developing roller 4*a* that are rotators of the developing device 4.

The driving device 40 includes a drive motor 41 as a driver. The drive motor 41 is fixed to a face of a bracket 22 opposite a face of the bracket 22 facing the image forming device 1. The motor shaft of the drive motor 41 penetrates the bracket 22. Teeth are formed on the perimeter of the motor shaft of the drive motor 41 to form a motor gear 41*a*.

The driving device 40 includes a photoconductor-drive transmitter 40*a* to transmit the driving force to the photoconductor 2, and a developing-drive transmitter 40*b* as a drive transmitter to transmit the driving force to the developing roller 4*b* and the developing screw 4*b*.

A photoconductor gear 42 that meshes with the motor gear 41*a* is disposed between the bracket 22 and a rear side plate 21 facing the image forming device 1. The driving force of the photoconductor gear 42 is transmitted to the photoconductor-drive transmitter 40*a* and the developing-drive transmitter 40*b*.

The driving device 40 includes a support shaft 42*a* at the rotation center of the surface of the photoconductor gear 42, and the support shaft 42*a* is rotatably supported by the bracket 22. The photoconductor gear 42 includes a spline shaft 43 extending toward the image forming device 1, and an end of the spline shaft 43 is inserted into a photoconductor joint 2*a* having a spline hole disposed at a rear end (a lower end of the photoconductor 2 in FIG. 3) of the photoconductor 2. Accordingly, the driving force of the drive motor 41 is transmitted to the photoconductor 2, and the photoconductor 2 is rotationally driven together with the photoconductor gear 42.

The developing-drive transmitter 40*b* includes, for example, a developing drive gear 44, an electromagnetic clutch 45, a developing output gear 47, a developing driving-side joint 48, a developing driven-side joint 49, a developing roller gear 52, and a developing screw gear 51. The developing drive gear 44 meshes with the photoconductor gear 42. The developing drive gear 44 is rotatably supported by a rotary shaft 46 to which the electromagnetic clutch 45 is attached to a clutch-drive transmitter 45*f* (see FIG. 4) of the electromagnetic clutch 45.

The rotary shaft 46 is rotatably supported by a clutch cover 24 that covers the electromagnetic clutch 45 and a cover 23 that covers the photoconductor-drive transmitter 40*a* closer to the photoconductor 2 than the rear side plate 21. A developing output gear 47 is attached to the rotary shaft 46 at a portion of the rotary shaft 46 closer to the image forming device 1 such that the developing output gear 47 rotates integrally with the rotary shaft 46. The developing output gear 47 meshes with a gear 48*a* of the developing drive-side joint 48. The developing driving-side joint 48 is rotatably supported by the rear side plate 21 and includes the gear 48*a* and a driving-side joint 48*b* formed of a spline shaft.

The developing driven-side joint 49 is rotatably supported by a rear-side face of the casing 1*a* of the image forming device 1 and includes a driven-side joint 49*a* formed of a spline hole and a gear 49*b*. The driving-side joint 48*b* of the developing driving-side joint 48 is inserted into the driven-side joint 49*a* such that the driving-side joint 48*b* is drivingly connected to the driven-side joint 49*a*. Thus, the driving force is transmitted from the developing driving-side joint 48 to the developing driven-side joint 49. The developing roller gear 52 that is attached to a rear end of the shaft of the developing roller 4*a* and a developing screw gear 51 that is attached to a rear end of the shaft of the developing screw 4*a* mesh with the gear 49*b* of the developing driven-side joint 49.

Next, a description is given of the electromagnetic clutch 45.

Figure 4:
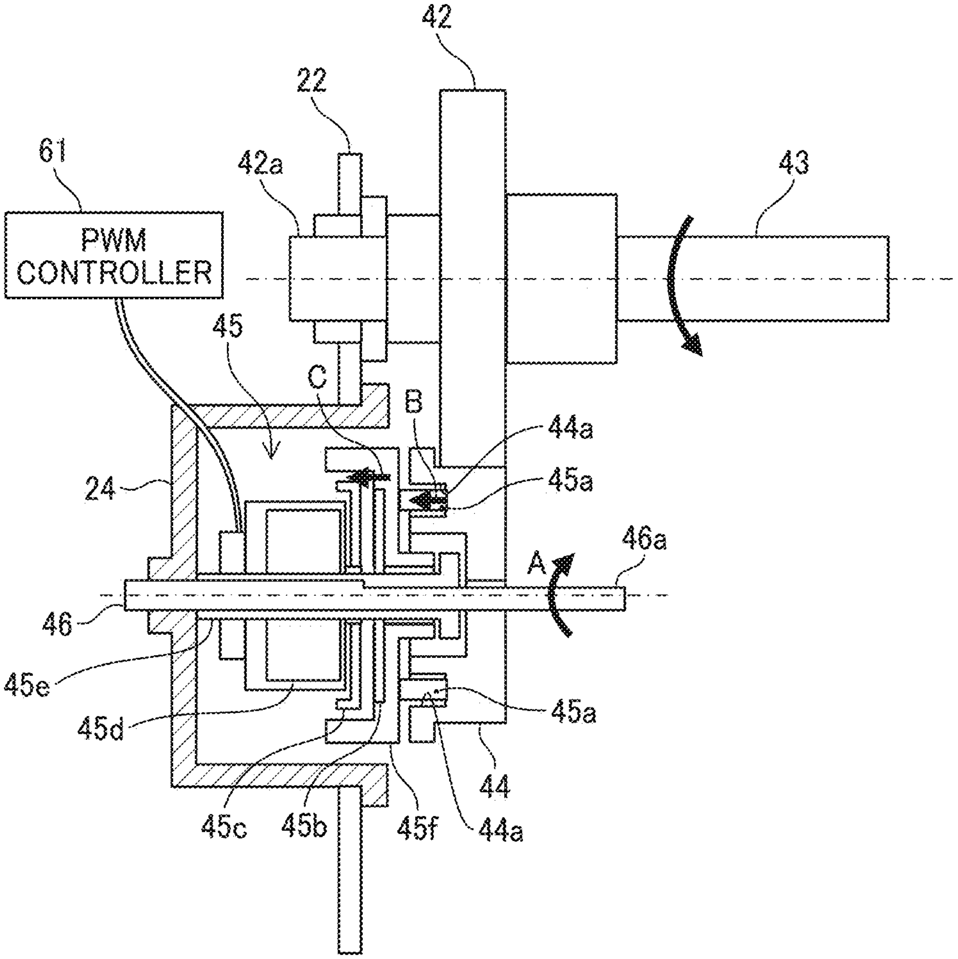
FIG. 4 is a cross-sectional view of an electromagnetic clutch according to an embodiment of the present disclosure.

FIG. 4 is a cross-sectional view of the electromagnetic clutch 45 according to the present embodiment.

The electromagnetic clutch 45 includes, for example, a shaft fixing portion 45*e*, an electromagnetic coil 45*d*, a rotor 45*c*, and an armature 45*b*. The shaft fixing portion 45*e* has an insertion hole into which the rotary shaft 46 is inserted, and the right side of the insertion hole in FIG. 4 has a D-shaped cross section. The rotary shaft 46 has a D-shaped cross section 46*a* in cross section, which is cut out to fit with the D-shaped portion of the shaft fixing portion 45*e*. The D-shaped cross-section of the shaft fixing portion 45*e* is engaged with the D-shaped cross section 46*a* of the rotary shaft 46. By so doing, the shaft fixing portion 45*e* is fixed to rotate together with the rotary shaft 46.

The electromagnetic coil 45*d* is attached to the shaft fixing portion 45*e* such that the electromagnetic coil 45*d* is rotatable with respect to the shaft fixing portion 45*e*. The electromagnetic coil 45*d* is connected to the PWM controller 61 that controls the value of the electric current flowing through the electromagnetic coil 45*d*.

The rotor 45*c* of the electromagnetic clutch 45 is fixed to the shaft fixing portion 45*e* to rotate integrally with the shaft fixing portion 45*e*. The armature 45*b*, which is a metallic disc, is attached to the clutch-drive transmitter 45*f*. The clutch-drive transmitter 45*f* includes a pair of driving claws 45*a* which extend toward the developing drive gear 44 and are fitted into corresponding one of fitting holes 44*a* formed in the developing drive gear 44. Each of the driving claws 45*a* fits into the corresponding one of fitting holes 44*a* formed in the developing drive gear 44 in the axial direction of the rotary shaft 46. By so doing, the clutch-drive transmitter 45*f* is integrally rotatable with the developing drive gear 44. In addition, the clutch-drive transmitter 45*f* is assembled to the developing drive gear 44 such that the clutch-drive transmitter 45*f* is movable relative to the developing drive gear 44 in the axial direction of the rotary shaft 46.

When the PWM controller 61 controls such that a predetermined value of electric current is supplied to the electromagnetic coil 45*d* to cause the electromagnetic coil 45*d* to generate an electromagnetic force, i.e., when the electromagnetic clutch 45 is turned on, the clutch-drive transmitter 45*f* that is integrated with the armature 45*b* slides toward the rotor 45*c* by the electromagnetic force of the electromagnetic coil 45*d*. The armature 45*b* is attracted to the rotor 45*c* by the electromagnetic force. The armature 45*b* is attracted to the rotor 45*c*. By so doing, the rotary shaft 46 and the developing drive gear 44 are drivingly coupled to each other, and the rotary shaft 46 and the developing drive gear 44 rotate integrally. Accordingly, the driving force of the drive motor 41 is transmitted to the developing roller 4*a* and the developing screw 4*b* via the photoconductor gear 42, the developing driving gear 44, the developing output gear 47, the developing driving-side joint 48, the developing driven-side joint 49, the developing roller gear 52, and the developing screw gear 51. As a result, the developing roller 4*a* and the developing screw 4*b* are rotated.

By contrast, when the electric current to the electromagnetic coil 45*d* is stopped and the electromagnetic force is cut off, i.e., when the electromagnetic clutch 45 is turned off, the attraction of the armature 45*b* to the rotor 45*c* is released. Accordingly, the developing drive gear 44 is rotatable relative to the rotary shaft 46, in other words, idly rotates. Accordingly, the driving force of the drive motor 41 is transmitted only to the developing driving gear 44 via the photoconductor gear 42 and is not transmitted to the developing output gear 47. Accordingly, the driving force of the drive motor 41 is not transmitted to the developing roller 4*a* and the developing screw 4*b* via the developing driving-side joint 48, the developing driven-side joint 49, the developing roller gear 52, and the developing screw gear 51. Thus, the developing roller 4*a* and the developing screw 4*b* do not rotate.

In the present embodiment, the developing drive gear 44 is a helical gear. When the developing drive gear 44 rotates while the driving force is transmitted as indicated by arrow A in FIG. 4, a thrust force is generated from the developing drive gear 44 toward the rotor 45*c* as indicated by arrow B in FIG. 4. Accordingly, the developing drive gear 44 causes the clutch-drive transmitter 45*f* to be pushed into the rotor 45*c* by the thrust force indicated by arrow B in FIG. 4. Accordingly, when the developing drive gear 44 is idly rotated with respect to the rotary shaft 46 while the electromagnetic clutch 45 is turned off, the thrust force can prevent a clearance between the rotor 45*c* and the armature 45*b* of the clutch-drive transmitter 45*f* from being widened. Accordingly, powder such as toner or foreign matters can be prevented from entering into the clearance between the rotor 45*c* and the armature 45*b*. Thus, the reliability of the electromagnetic clutch 45 can be enhanced. Further, the clearance between the rotor 45*c* and the armature 45*b* can be maintained to be narrow. Accordingly, even if the electromagnetic force of the electromagnetic coil 45*d* is weak, the clutch-drive transmitter 45*f* can be slid toward the rotor 45*c* to attract the armature 45*b* to the rotor 45*c*. Such a configuration as described above can prevent the value of the electric current flowing through the electromagnetic coil 45*d* from increasing. As a result, the power consumption of the developing-drive transmitter 40*b* as the drive transmitter can be reduced.

Metallic powder may be generated between the armature 45*b* and the rotor 45*c* when the electromagnetic clutch 45 is engaged and disengaged. However, the clearance between the rotor 45*c* and the clutch-drive transmitter 45*f* can be maintained to be narrow. Accordingly, the metallic powder can be held in the clearance, and leaking of the metallic powder to the outside can be prevented.

The driving device 40 of the present embodiment drives the photoconductor 2 and the rotators, i.e., the developing roller 4*a* and the developing screw 4*b*, of the developing device 4 by the drive motor 41. The developing roller 4*a* conveys or stirs the developer. Accordingly, noise that is generated from the driving device 40 can be reduced as compared with a case in which the photoconductor 2 and the rotators of the developing device 4 are driven by separate driving motors. In addition, the driving device 40 can be downsized as compared with the case in which the photoconductor 2 and the rotator of the developing device 4 are driven by separate driving motors. The electromagnetic clutch 45 is provided for the developing-drive transmitter 40*b*. Accordingly, the driving of the developing device 4 can be stopped in processes other than the image forming process. Such a configuration as described above can extend the operational life of the developing device 4.

Figure 5A:
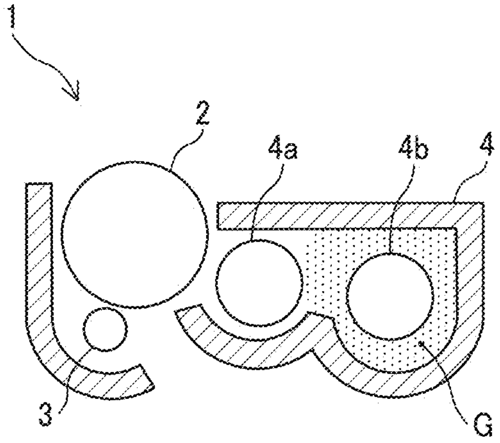
FIG. 5A is a schematic diagram illustrating an inside of a developing device when developer is stirred and softly spread around a developer screw, which is a normal condition inside the developing device, according to an embodiment of the present disclosure.
Figure 5B:
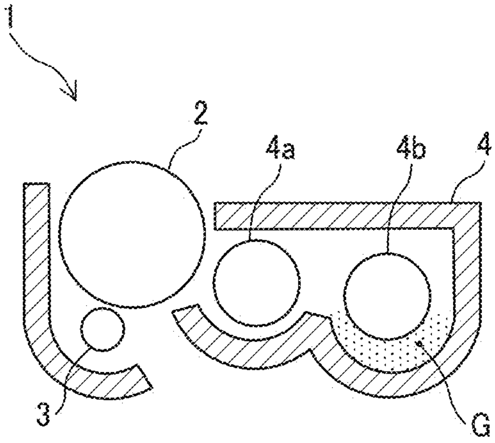
FIG. 5B is a schematic diagram illustrating an inside of the developing device of FIG. 5A, when the developer is thickened and firm.

In a normal condition, the developer G in the developing device 4 is stirred and softly spread around a developer screw 4*b* as illustrated in FIG. 5A. However, the developer G in the developing device 4 may be thickened and firm as illustrated in FIG. 5B when, for example, the developing device 4 stops driving for a long time, or the image forming apparatus 100 is vibrated during transportation.

Figure 6:
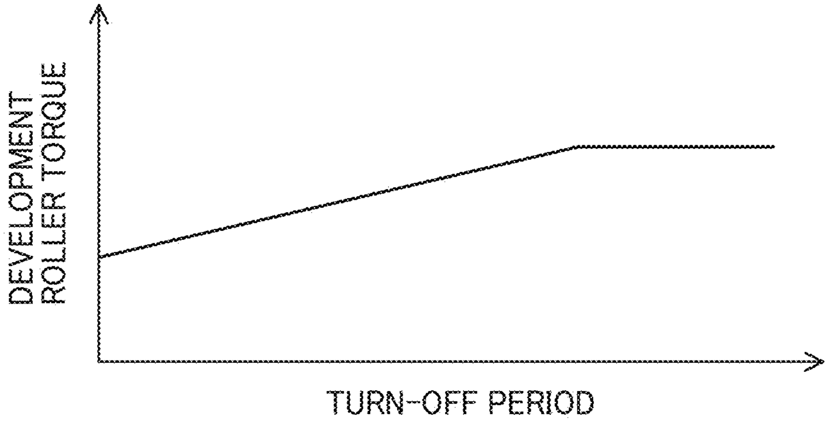
FIG. 6 is a graph illustrating a relation between the downtime of the developing device and a developing torque, according to an embodiment of the present disclosure.

FIG. 6 is a graph illustrating a relation between the downtime of the developing device 4 and the developing torque, which is a torque to rotationally drive, for example, the developing screw 4*b*.

After the developing device 4 is stopped, the developer G in the developing device 4 sinks into a lower portion of the developing device 4 and gradually thickened and firm by its own weight, such that the developing torque is gradually increased as illustrated in FIG. 6. For example, after the image forming apparatus 100 is operated during the daytime, the developing torque is likely to increase by the next morning when the image forming apparatus 100 is turned off overnight because the developer G may be thickened and firm. Alternatively, the developer G may be further thickened and firm and the developing torque is further increased when the image forming apparatus 100 is operated after a long holiday period in summer or winter.

When the electromagnetic force of the electromagnetic clutch 45 is weak, the developing torque is higher than the adhesion force between the rotor 45*c* and the armature 45*b*, when the developer G in the developing device 4 is thickened and firm. Accordingly, the armature 45*b* slides with respect to the rotor 45*c*, and the driving force cannot be favorably transmitted. For this reason, as the electromagnetic clutch 45, preferably, an electromagnetic clutch that can generate a strong electromagnetic force is employed such that the driving force can be favorably transmitted even when the developer G in the developing device 4 is thickened and firm.

However, in the normal condition in which the developer G in the developing device 4 is stirred and softly spread around the developer screw 4*b*, when the electromagnetic coil 45*d* is driven at the duty cycle of 100%, the electromagnetic force of the electromagnetic coil 45*d* is excessive with respect to the developing torque, and the power consumption of the developing-drive transmitter 40*b* as the drive transmitter is wasted. For this reason, in the present embodiment, the PWM controller 61 controls such that the duty cycle of the electromagnetic clutch 45 changes in accordance with fluidity of the developer G in the developing device 4, such that the value of the electric current to be supplied to the electromagnetic coil 45*d* is changed. A description is given of a first embodiment of the present disclosure is described with reference to FIG. 7.

First Embodiment

Figure 7:
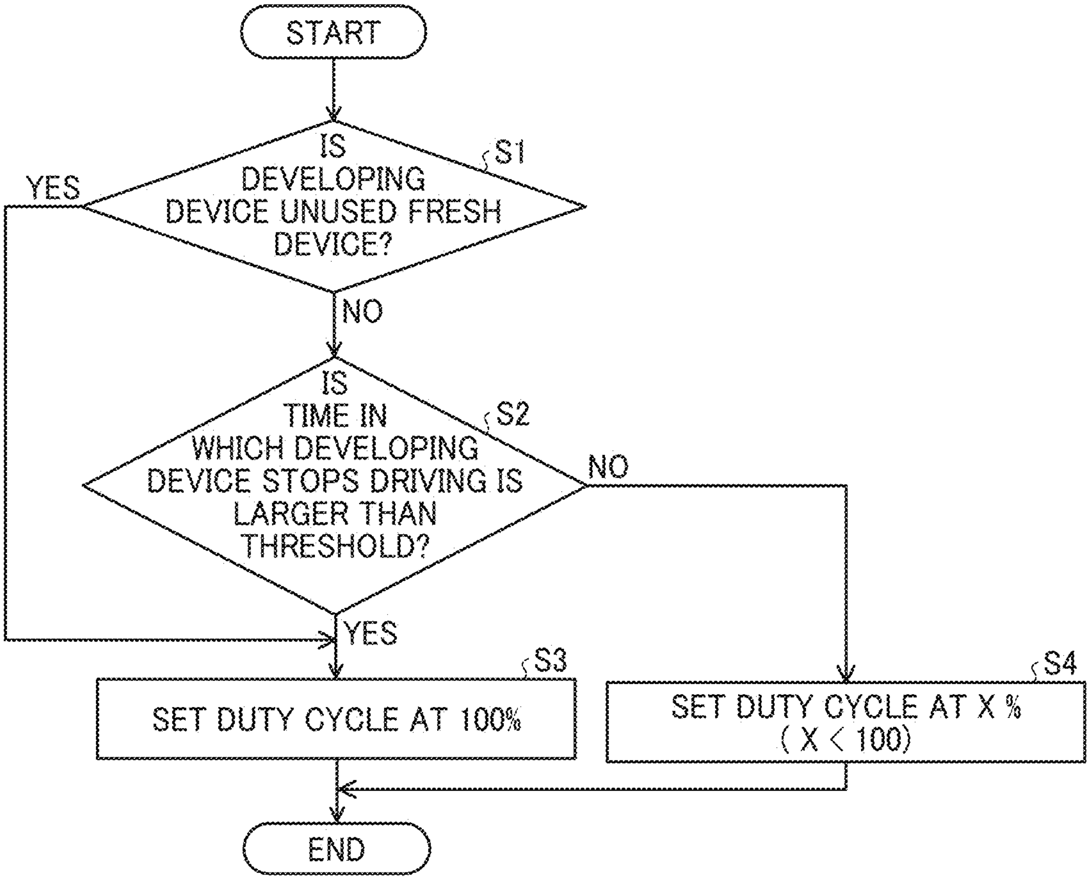
FIG. 7 is a control flowchart of an electromagnetic clutch according to a first embodiment of the present disclosure.

FIG. 7 is a control flowchart of the electromagnetic clutch 45 according to a first embodiment of the present disclosure.

When the image forming process is started, the PWM controller 61 checks whether the developing device 4 is an unused fresh device (step S1), as illustrated in FIG. 7. When the developing device 4 is an unused fresh device (YES in step S1), the PWM controller 61 determines that the developer G in the developing device 4 is thickened and firm because the image forming apparatus 1 is vibrated during the transportation (see FIG. 5B). Accordingly, the PWM controller 61 sets the duty cycle of the electromagnetic clutch 45 to 100% (step S3) and causes the electromagnetic clutch 45 to be driven at the duty cycle of 100%. In so doing, the armature 45*b* can be attracted to the rotor 45*c* by a strong electromagnetic force. As a result, the rotor 45*c* and the armature 45*b* do not slide on each other and the driving force can be reliably transmitted. Accordingly, the developing roller 4*a* and the developing screw 4*b* can be reliably driven to rotate.

A known method can be employed to determine whether the developing device 4 is an unused fresh device. For example, the developing device 4 includes the IC chip 71 to store the usage data of the developing device 4, and the usage data stored in the IC chip 71 is read by the IC-chip reader 72 (see FIG. 16) when the image forming process is started. By so doing, whether the developing device 4 that is mounted on the image forming apparatus 100 is an unused fresh device can be determined.

If the developing device 4 is not new (NO in step S1), the PWM controller 61 checks whether the operation stop time of the developing device 4 exceeds the threshold (step S2). For example, when the electromagnetic clutch 45 is turned off (duty cycle: 0%), the PWM controller 61 starts measuring time by the timer 73 (see FIG. 16). Then, when the image forming process is started, the PWM controller 61 checks the time measured by the timer 73. By so doing, the PWM controller 61 can grasp the operation stop time of the developing device 4.

When the operation stop time of the developing device 4 exceeds the threshold (YES in step S2), the PWM controller 61 determines that the developer G in the developing device 4 is thickened and firm (see FIG. 5B), sets the duty cycle to 100% (step S3), and causes the electromagnetic clutch 45 to be driven at the duty cycle of 100%. Such a configuration as described above allows the armature 45*b* to be attracted to the rotor 45*c* by a strong electromagnetic force, the driving force to be reliably transmitted without the rotor 45*c* and the armature 45*b* slipping on each other. Accordingly, the developing roller 4*a* and the developing screw 4*b* can be reliably driven to rotate.

By contrast, when the operation stop time of the developing device 4 does not exceed the threshold (NO in step S2), the developer G in the developing device 4 is stirred and softly spread around the developer screw 4*b* (see FIG. 5A). Accordingly, the developing torque is low. Accordingly, even with a weak electromagnetic force, the rotor 45*c* and the armature 45*b* do not slip on each other, and the driving force can be reliably transmitted. Accordingly, in this case, the duty cycle of the electromagnetic clutch 45 is decreased to X % (X<100) to decrease the value of the electric current flowing through the electromagnetic coil 45*d* (step S4). Thus, even when the developer G in the developing device 4 is stirred and softly spread around the developer screw 4*b*, the power consumption of the developing-drive transmitter 40*b* as the drive transmitter can be reduced as compared with the case in which the electromagnetic clutch 45 is driven at the duty cycle of 100%. Thus, the energy saving of the drive transmitter can be achieved. In addition, the heat generation of the electromagnetic clutch 45 can be reduced, and the heat of the electromagnetic clutch 45 can be prevented from adversely affecting the peripheral components arranged around the electromagnetic clutch 45.

Figure 8A:
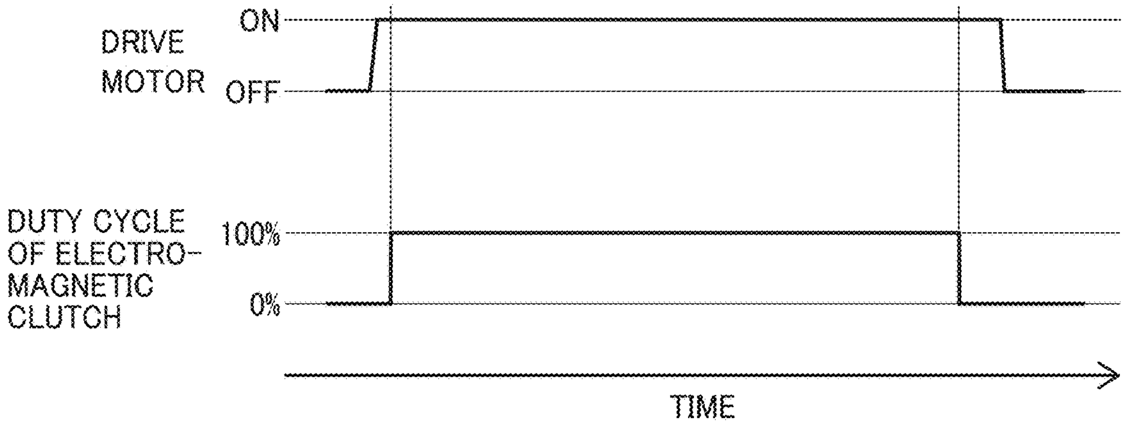
FIG. 8A is a timing chart illustrating an operation of a drive motor and a duty cycle of an electromagnetic clutch when developer in a developing device is thickened and firm, according to an embodiment of the present disclosure.
Figure 8B:
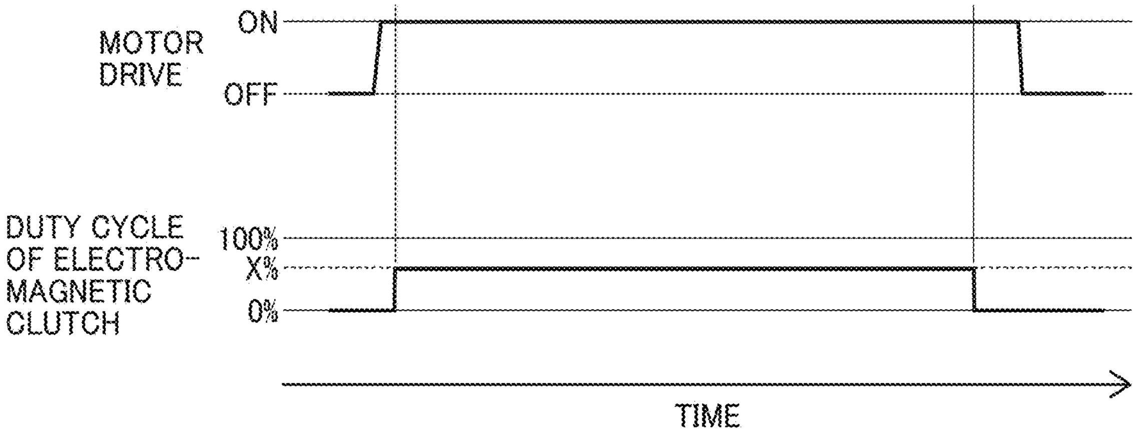
FIG. 8B is a timing chart illustrating an operation of a drive motor and the duty cycle of an electromagnetic clutch when developer in a developing device is stirred and softly spread around a developer screw; according to an embodiment of the present disclosure.

FIG. 8A is a timing chart illustrating the operation of the drive motor 41 and the duty cycle of the electromagnetic clutch 45 when the developer G in the developing device 4 is thickened and firm, according to the present embodiment. FIG. 8B is a timing chart illustrating the operation of the drive motor 41 and the duty cycle of the electromagnetic clutch 45 when the developer G in the developing device 4 is stirred and softly spread around the developer screw 4*b*.

As illustrated in FIG. 8B, the electromagnetic clutch 45 is turned on immediately after the drive motor 41 is driven to start the rotation of the photoconductor 2. Thus, the electromagnetic clutch 45 is driven at a predetermined duty cycle. A certain amount of time is necessary from a timing at which driving of the photoconductor 2 is started until the latent image formed on the photoconductor 2 reaches the developing region. During this time, the developer G in the developing device 4 is sufficiently spread, and the latent image can be developed by the developer G that is sufficiently spread. The duty cycle of the electromagnetic clutch 45 may be changed from 100% to X % at a timing at which the developing roller 4*a* and the developing screw 4*b* rotate for a predetermined time and the developer G in the developing device 4 is sufficiently spread.

In the above description, there is one threshold of the operation stop time of the developing device 4. However, multiple thresholds may be set, and the condition of the developer G in the developing device 4 is divided into multiple levels based on how loosely or densely the developer G is spread in the developing device 4, and the duty cycle corresponding to each of the levels may be set.

When the developer G is exposed to a high-temperature and high-humidity environment, the fluidity of the developer G is likely to be deteriorated, and the developing torque may be increased. Accordingly, the temperature-humidity sensor 201 may be disposed inside the body of the image forming apparatus 100, and the duty cycle of the electromagnetic clutch 45 may be changed based on a detection result of the temperature-humidity sensor 201.

Figure 9:
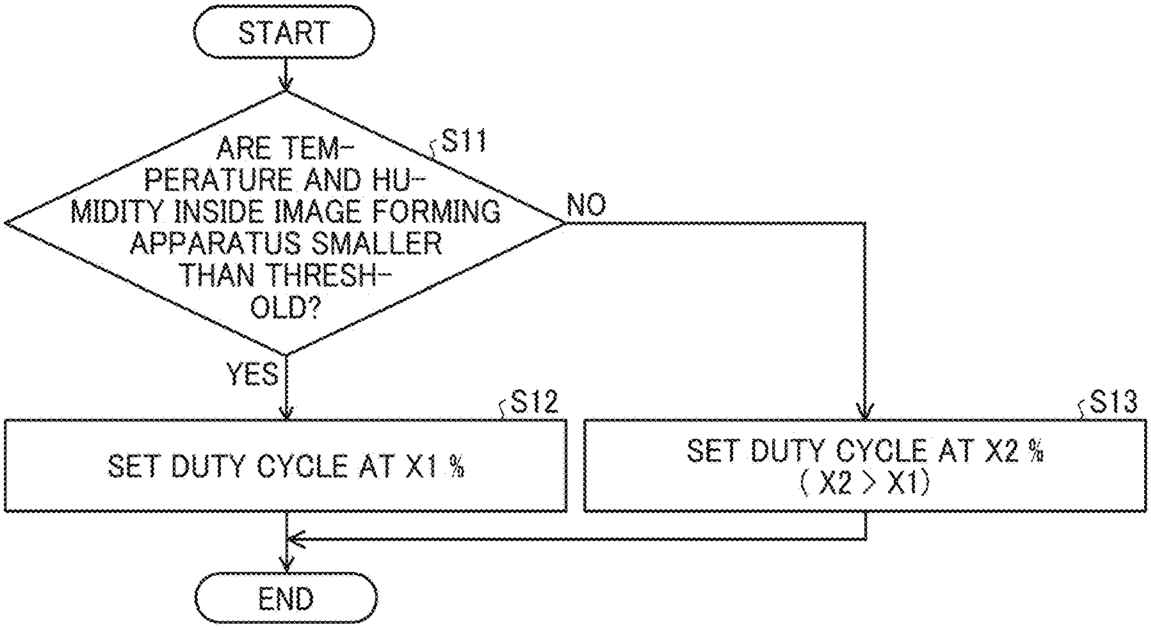
FIG. 9 is a control flowchart of an electromagnetic clutch based on a detection result of a temperature-humidity sensor, according to an embodiment of the present disclosure.

FIG. 9 is a control flowchart of the electromagnetic clutch 45 based on the detection result of the temperature-humidity sensor 201, according to the present embodiment.

As illustrated in FIG. 9, the PWM controller 61 checks the temperature and the humidity detected by the temperature-humidity sensor 201 when the image forming process is started (step S11). When the temperature and humidity detected by the temperature-humidity sensor 201 are smaller than respective thresholds, and the environment in which the image forming apparatus 100 is installed is not high-temperature and high-humidity environment (YES in step S11), the fluidity of the developer G is favorable and the developing torque is low. Accordingly, even with a weak electromagnetic force, the rotor 45*c* and the armature 45*b* do not slip on each other, and the driving force can be reliably transmitted. Accordingly, in this case, the duty cycle is set to a low value of X1%, and the value of the electric current flowing through the electromagnetic coil 45*d* is reduced (step S12). Owing to such a configuration, when the fluidity of the developer G in the developing device 4 is favorable, the power consumption of the developing-drive transmitter 40*b* as the drive transmitter can be reduced as compared with the case in which the electromagnetic clutch 45 is driven at the duty cycle of 100%. Accordingly, the energy saving of the drive transmitter can be achieved.

By contrast, when the temperature and the humidity detected by the temperature-humidity sensor 201 are equal to or higher than the respective thresholds and the environment in which the image forming apparatus 100 is installed is a high-temperature and high-humidity environment (YES in step S11), as described above, the fluidity of the developer G may be reduced and the developing torque may be increased. Accordingly, the duty cycle is set to X2% higher than the above-described X1%, and the value of the electric current flowing through the electromagnetic coil 45*d* is increased (step S13). Accordingly, even when the fluidity of the developer G in the developing device 4 is lowered under the high temperature and high humidity environment, the rotor 45*c* and the armature 45*b* do not slip on each other, and the driving force can be reliably transmitted. Accordingly, the developing roller 4*a* and the developing screw 4*b* can be reliably driven to rotate. The above-described values of X1 and X2 may be determined as appropriate according to the characteristics of the developer G, and X2 may be less than 100%.

In addition, the duty cycle of the electromagnetic clutch 45 may be set based on the detection result of the temperature-humidity sensor 201 and the operation stop time. Accordingly, the electric current of an appropriate value that corresponds to how the developer G is thickened and firm and the fluidity of the developer G can be supplied to the electromagnetic coil 45*d*. As a result, the energy saving of the image forming apparatus 100 can be achieved, and the developing screw 4*b* and the developing roller 4*a* can be reliably driven to rotate.

A sensor that detects temperature and humidity is employed as the temperature-humidity sensor 201. The PWM controller 61 controls the value of the electric current flowing through the electromagnetic coil 45*d* based on the temperature and the humidity detected by the temperature-humidity sensor 201. The temperature-humidity sensor 201 may detect either the temperature or the humidity. The PWM controller 61 controls the value of the electric current flowing through the electromagnetic coil 45*d* based on either the temperature or the humidity detected by the temperature-humidity sensor 201.

Second Embodiment

Figure 10:
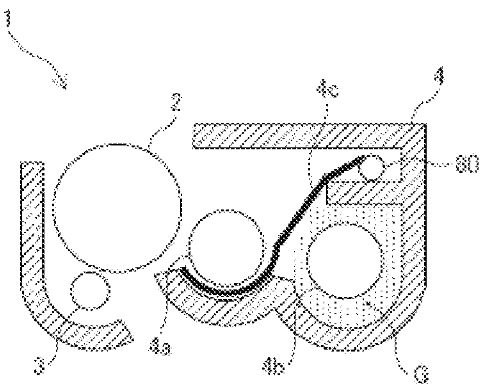
FIG. 10 is a diagram illustrating a developing device according to a second embodiment of the present disclosure.

FIG. 10 is a schematic diagram illustrating the developing device 4 according to a second embodiment of the present disclosure.

As illustrated in FIG. 10, the developing device 4 of the second embodiment includes a protection sheet 4*c* and a winding roller 80. The protection sheet 4*c* protects components in the developing device 4 when the image forming apparatus 100 is shipped from the factory. The winding roller 80 serves as a winder to wind the protection sheet 4*c*. When the developing device 4 as an unused fresh device is set in the body of the image forming apparatus 100, the protection sheet 4*c* is wound by the winding roller 80. As described above, the winding roller 80 is disposed in the developing device 4. By so doing, the protection sheet 4*c* can be automatically wound, and the workability of the maintenance work can be enhanced.

Figure 11A:
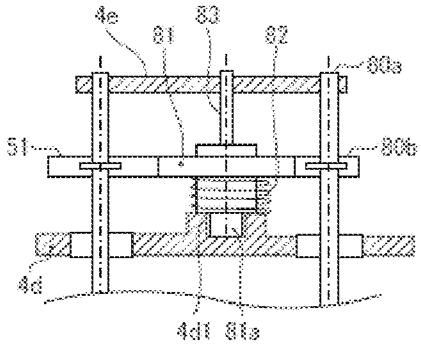
FIGS. 11A and 11B are diagrams each illustrating a drive transmission device that transmits a driving force of a drive motor to a winding roller, according to the second embodiment of the present disclosure.
Figure 11B:
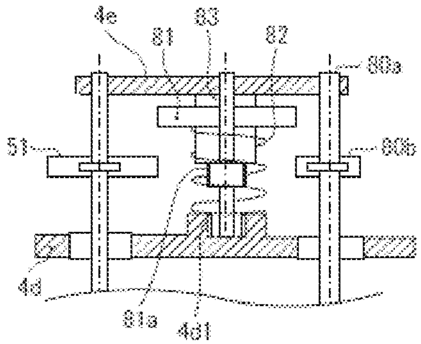

FIGS. 11A and 11B are diagrams each illustrating a drive transmission device that transmits the driving force of the drive motor 41 to the winding roller 80, according to the present embodiment. FIG. 11A is a diagram illustrating the drive transmission device before the protection sheet 4*c* is wound. FIG. 11B is a diagram illustrating the drive transmission device after the protection sheet 4*c* is wound.

As illustrated in FIGS. 11A and 11B, a winding gear 80*b* is attached to a shaft 80*a* of the winding roller 80. The driving force of the drive motor 41 is transmitted from the developing screw gear 51 to the winding gear 80*b* via an idler gear 81 to rotationally drive the winding roller 80.

The idler gear 81 is rotatably supported by a developing casing 4*d* of the developing device 4 and an idler support shaft 83 held by a developer bracket 4*e*. The idler gear 81 has a male screw 81*a*. As illustrated in FIG. 11A, before the winding roller 80 winds the protection sheet 4*c*, the male screw 81*a* is screwed to a female screw 4*d*1 formed in the developing casing 4*d*. The idler gear 81 is biased toward the developing bracket 4*e* by a coil spring 82.

When the drive motor 41 is driven after the developing device 4 as an unused fresh device is set, the driving force is transmitted from the developing screw gear 51 to the idler gear 81 to wind the protection sheet 4*c* around the winding roller 80. At this time, the idler gear 81 rotates in a direction in which the male screw 81*a* and the female screw 4*d*1 are unscrewed. The rotation amount of the idler gear 81 until the male screw 81*a* and the female screw 4*d*1 are unscrewed is larger than the rotation amount of the idler gear 81 until the winding roller 80 finishes winding the protection sheet 4*c*. Accordingly, after winding of the protection sheet 4*c* by the winding roller 80 is completed, the male screw 81*a* and the female screw 4*d*1 are unscrewed. When the male screw 81*a* and the female screw 4*d*1 are unscrewed, as illustrated in FIG. 11B, the idler gear 81 moves toward the developing bracket 4*e* by the biasing force of the coil spring 82. Accordingly, the idler gear 81 is disengaged from the developing screw gear 51 and the winding gear 80*b*. As a result, after the protection sheet 4*c* is wound, the driving force of the drive motor 41 is not transmitted to the winding roller 80, and the winding roller 80 is not rotationally driven.

As described above, after the protection sheet 4*c* is wound by the winding roller 80, the idler gear 81 and the developing screw gear 51 are disengaged from each other. Accordingly, after the protection sheet 4*c* is wound, there is no load torque that rotationally drives the winding roller 80. Accordingly, the developing torque while the developing operation is performed is smaller than that the developing torque when the electromagnetic clutch 45 is initially driven the first time when the developing device 4 as an unused fresh device is set in which the protection sheet 4*c* is wound around the winding roller 80.

As the electromagnetic clutch 45, preferably, an electromagnetic clutch is employed that generates a strong electromagnetic force to transmit the driving force without causing the rotor 45*c* and the armature 45*b* to slip on each other at least when the protection sheet 4*c* is wound around the winding roller 80.

By contrast, during the developing operation that is performed after the protection sheet 4*c* is wound around the winding roller 80, when the electromagnetic coil 45*d* is driven at the duty cycle of 100%, the electromagnetic force of the electromagnetic coil 45*d* is excessive with respect to the developing torque. Accordingly, the power consumption of the drive transmitter is wasted. For this reason, in the second embodiment, the PWM controller 61 controls such that the duty cycle of the electromagnetic clutch 45 after the protection sheet 4*c* is wound is smaller than the duty cycle while the protection sheet 4*c* is wound. Accordingly, the PWM controller 61 causes the value of the electric current passing through the electromagnetic coil 45*d* after the protection sheet 4*c* is wound to be smaller than the value of the electric current passing through the electromagnetic coil 45*d* when the protection sheet 4*c* is wound.

Figure 12A:
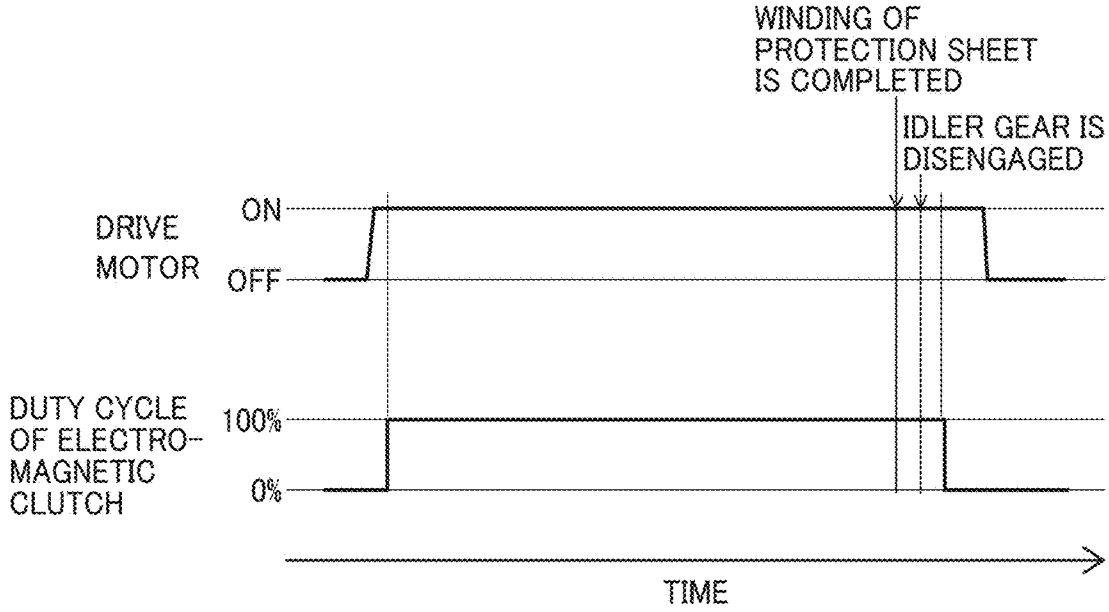
FIG. 12A is a timing chart illustrating an operation of a drive motor and the duty cycle of an electromagnetic clutch when a protection sheet is wound, according to an embodiment of the present disclosure.
Figure 12B:
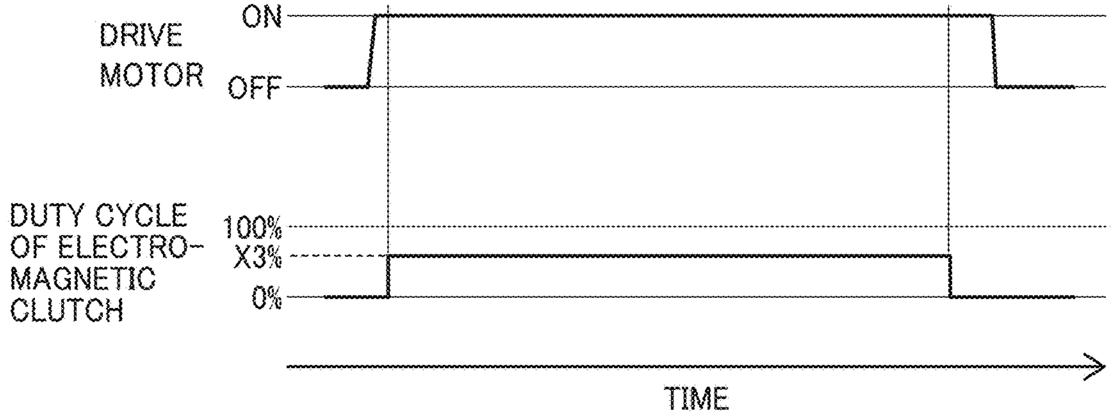
FIG. 12B is a timing chart illustrating an operation of the driving motor and a duty cycle of the electromagnetic clutch of FIG. 12A, while developing operation is performed.

FIG. 12A is a timing chart illustrating an operation of the drive motor 41 and the duty cycle of the electromagnetic clutch 45 when the protection sheet 4*c* is wound. FIG. 12B is a timing chart illustrating the operation of the drive motor 41 and the duty cycle of the electromagnetic clutch 45 when the developing operation is performed.

Winding the protection sheet 4*c* is started by, for example, when the operation panel 111 of the image forming apparatus 100 is operated by a service representative. In addition, similar to the first embodiment, when the developing device 4 is set in the image forming apparatus 100, the IC-chip reader 72 reads the IC chip 71 disposed in the developing device 4 as described above. By so doing, the controller 300 determines whether the developing device 4 is an unused fresh device and causes the protection sheet 4*c* to be wound automatically when the developing device 4 is an unused fresh device.

When the protection sheet 4*c* is wound, as illustrated in FIG. 12A, the PWM controller 61 drives the electromagnetic clutch 45 at the duty cycle of 100%. Such a configuration as described above allows the armature 45*b* to be attracted to the rotor 45*c* by a strong electromagnetic force, the driving force to be reliably transmitted without the rotor 45*c* and the armature 45*b* slipping on each other. As a result, the winding roller 80 can be reliably driven to rotate, and the protection sheet 4*c* can be wound.

When the winding of the protection sheet 4*c* around the winding roller 80 is completed and the drive coupling of the idler gear 81 to the developing screw gear 51 is released, the PWM controller 61 sets the duty cycle to 0% and turns off the electromagnetic clutch 45.

By contrast, during the developing operation, the drive coupling of the idler gear 81 to the developing screw gear 51 is released. Accordingly, no load torque is applied to the electromagnetic clutch 45 to cause the winding roller 80 to rotate. Accordingly, even with a weak electromagnetic force, the rotor 45*c* and the armature 45*b* do not slip on each other, and the driving force can be reliably transmitted. Accordingly, as illustrated in FIG. 12B, when the developing operation is performed, the PWM controller 61 sets the duty cycle to X3% ($X3<100$) to reduce the value of the electric current flowing through the electromagnetic coil 45*d*. Such a configuration as described above allows the power consumption of the drive transmitter to be reduced as compared with the case in which the electromagnetic clutch 45 is driven at the duty cycle of 100%. Accordingly, the energy saving of the drive transmitter can be achieved. In addition, the heat generation of the electromagnetic clutch 45 can be reduced, and the heat of the electromagnetic clutch 45 can be prevented from adversely affecting on the peripheral components arranged around the electromagnetic clutch 45.

When the developing operation is performed, the duty cycle may be set based on the operation stop time of the developing device 4 and the detection result of the temperature-humidity sensor 201, in a similar manner to the first embodiment.

Third Embodiment

Next, a description is given of a third embodiment of the present disclosure.

When the electromagnetic clutch 45 is switched between on and off, the developing torque rapidly changes. By so doing, the driving device 40 vibrates and the vibration of the driving device 40 may affect an image to be formed. Thus, a defective image such as an image with shock jitter, in which horizontal black streaks occur on a recording medium due to a shock when the recording medium is inserted, may be formed. For this reason, in the third embodiment, the value of the electric current flowing through the electromagnetic clutch 45 is gradually changed when the electromagnetic clutch 45 is switched between on and off.

Figure 13:
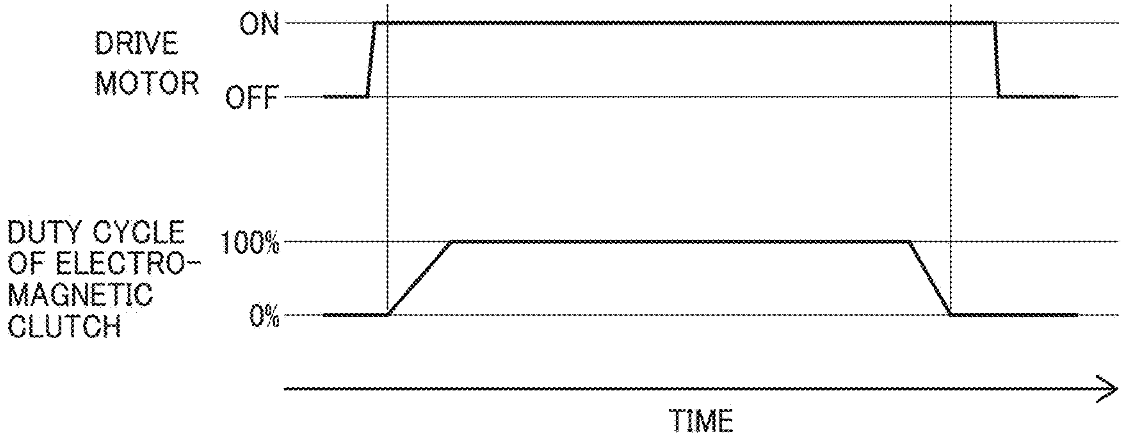
FIG. 13 is a timing chart illustrating an operation of a drive motor and a duty cycle of an electromagnetic clutch, according to a third embodiment of the present disclosure.

FIG. 13 is a timing chart illustrating the operation of the drive motor 41 and the duty cycle of the electromagnetic clutch 45 according to the third embodiment.

As illustrated in FIG. 13, in the third embodiment, when the drive motor 41 is switched on, the PWM controller 61 controls to gradually increase the duty cycle of the electromagnetic clutch 45. Accordingly, the value of the electric current flowing through the electromagnetic coil 45*d* of the electromagnetic clutch 45 gradually increases, and the electromagnetic force gradually increases.

In an initial stage in which the drive motor 41 is switched on, the duty cycle of the electromagnetic clutch 45 is low and the electromagnetic force of the electromagnetic coil 45*d* is weak. Accordingly, the armature 45*b* slips with respect to the rotor 45*c* with a small torque. As the duty cycle of the electromagnetic clutch 45 increases, the electromagnetic force gradually increases. Accordingly, the armature 45*b* is gradually less likely to slip with respect to the rotor 45*c*. Accordingly, the electromagnetic clutch 45 is drivingly coupled such that the developing torque gradually increases.

When the electromagnetic clutch 45 is switched off, the duty cycle of the electromagnetic clutch 45 is gradually decreased as illustrated in FIG. 13. Accordingly, the value of the electric current flowing through the electromagnetic coil 45*d* of the electromagnetic clutch 45 gradually decreases, and the electromagnetic force gradually weakens. Accordingly, the armature 45*b* is gradually more likely to slip with respect to the rotor 45*c*, and the electromagnetic clutch 45 is disengaged such that the developing torque gradually decreases.

As described above, gradually changing the duty cycle of the electromagnetic clutch 45 to gradually change the value of the electric current flowing through the electromagnetic clutch 45 allows the developing torque fluctuation to be reduced when the electromagnetic clutch 45 is switched on and off. Accordingly, the vibration of the driving device 40 can be reduced, and the occurrence of a defective image such as an image with shock jitter can be prevented.

As described above with reference to FIG. 4, the developing drive gear 44, which is disposed coaxially with the electromagnetic clutch 45 and is assembled to the clutch-drive transmitter 45*f* of the electromagnetic clutch 45, is a helical gear. Accordingly, the developing drive gear 44 generates a thrust force on the rotor 45*c* when the developing drive gear 44 drives. Such a configuration as described above allows the attraction of the armature 45*b* to the rotor 45*c* to be assisted. Accordingly, the armature 45*b* can be attracted to the rotor 45*c* even when the duty cycle of the electromagnetic clutch 45 is low and the electromagnetic force is weak. Thus, the developing torque can be gradually increased from the initial stage in which the electromagnetic clutch 45 is switched on. At the same time, the developing torque can be gradually decreased until when the electromagnetic clutch 45 is switched off. Such a configuration as described above allows the developing torque to be further gradually changed when the electromagnetic clutch 45 is switched on and off. Thus, the occurrence of vibration of the driving device 40 can be reduced.

Figure 14A:
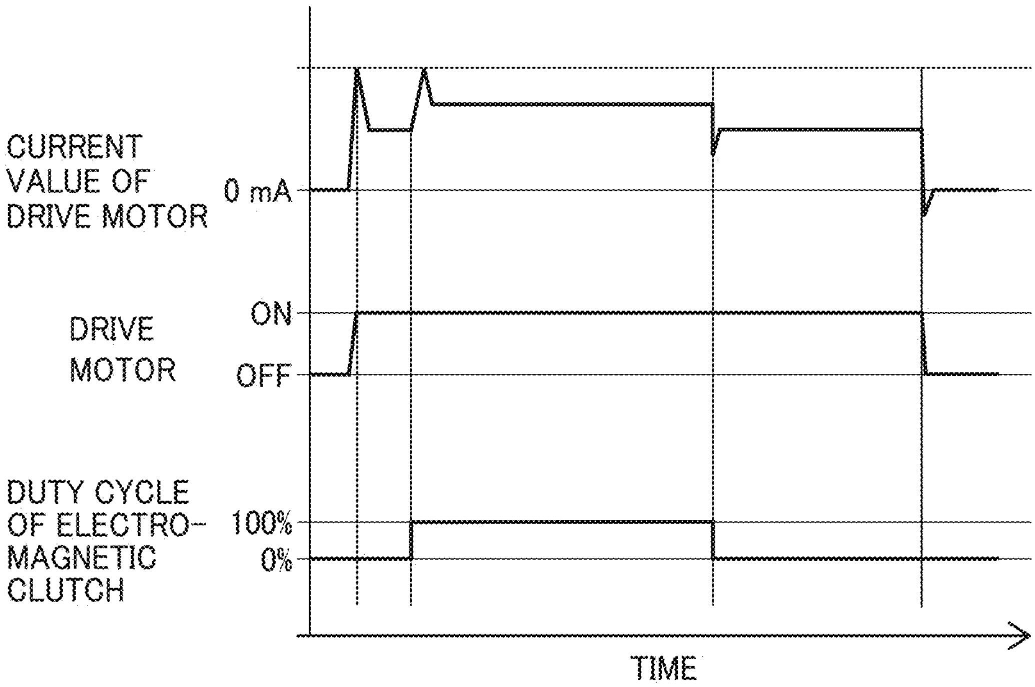
FIG. 14A is a timing chart illustrating a current value of a drive motor, an operation of a drive motor, and a duty cycle of an electromagnetic clutch, when the duty cycle of the electromagnetic clutch is instantaneously changed greatly to switch on and off the electromagnetic clutch, according to an embodiment of the present disclosure.
Figure 14B:
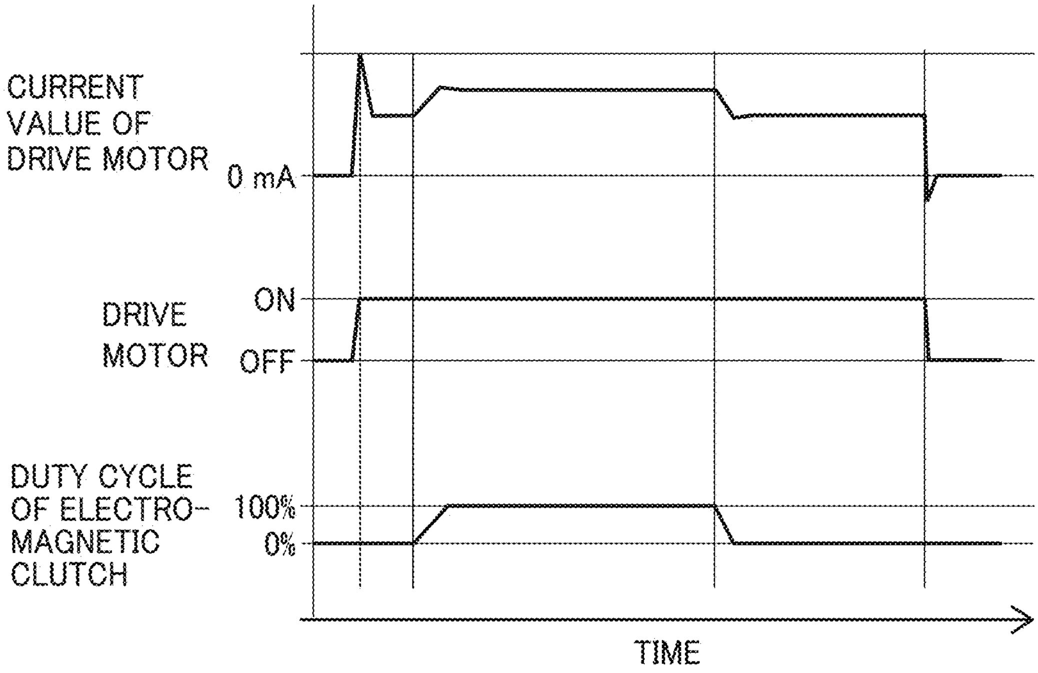
FIG. 14B is a timing chart illustrating a current value of a drive motor, an operation of a drive motor, and a duty cycle of an electromagnetic clutch, when the duty cycle of the electromagnetic clutch is gradually changed to switch on and off the electromagnetic clutch, according to an embodiment of the present disclosure.

FIG. 14A is a timing chart illustrating the value of the electric current of the drive motor 41, the operation of the drive motor 41, and the duty cycle of the electromagnetic clutch 45, when the duty cycle of the electromagnetic clutch 45 is instantaneously changed greatly to switch the electromagnetic clutch 45 on and off. FIG. 14B is a timing chart illustrating the value of the electric current of the drive motor 41, the operation of the drive motor 41, and the duty cycle of the electromagnetic clutch 45 when the duty cycle of the electromagnetic clutch 45 is gradually changed to switch the electromagnetic clutch 45 on and off.

As illustrated in FIG. 14A, when the duty cycle of the electromagnetic clutch 45 is instantaneously changed to cause the electromagnetic clutch 45 to instantaneously drive and instantaneously stop driving, the developing torque rapidly fluctuates. Accordingly, the value of the electric current of the drive motor 41 overshoots, and the value of the electric current of the drive motor 41 rapidly fluctuates.

Alternatively, as illustrated in FIG. 14B, when the duty cycle of the electromagnetic clutch 45 is gradually changed and the drive motor 41 is switched on and off to cause the developing torque to gradually change, the value of the electric current of the drive motor 41 also gradually changes.

As described above, whether the developing torque gradually changes can be grasped when the electromagnetic clutch 45 is switched on and off based on the fluctuation amount per unit time of the value of the electric current of the drive motor 41. Accordingly, gradually changing the duty cycle of the electromagnetic clutch 45 when switching the electromagnetic clutch 45 between on and off while monitoring the value of the electric current of the drive motor 41, fluctuation of the developing torque can be more reliably gradual when the electromagnetic clutch 45 is switched between on and off.

Figure 15A:
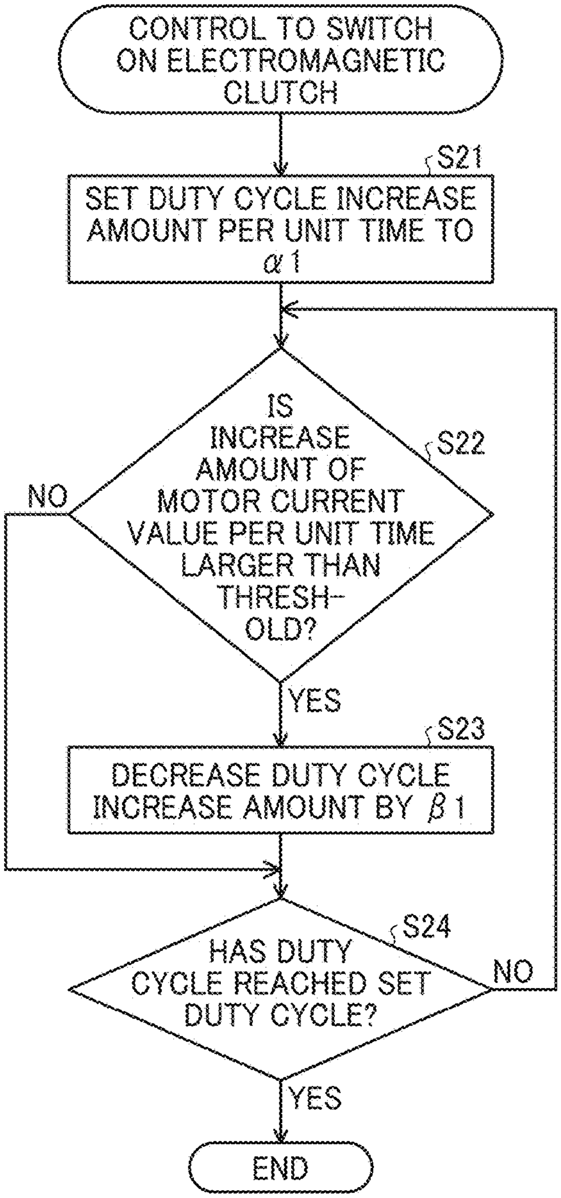
FIG. 15A is a control flowchart when an electromagnetic clutch is turned on based on a current value of a drive motor, according to an embodiment of the present disclosure.
Figure 15B:
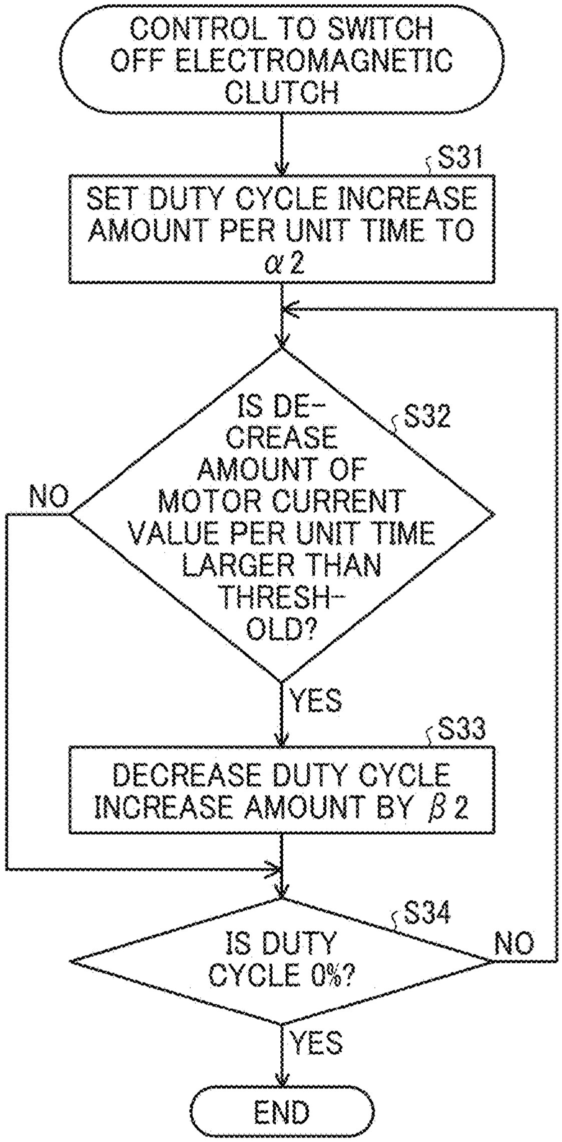
FIG. 15B is a control flowchart when the electromagnetic clutch is turned off based on a current value of a drive motor, according to an embodiment of the present disclosure.

FIG. 15A is a control flowchart when the electromagnetic clutch 45 is turned on based on the value of the electric current of the drive motor 41, and FIG. 15B is a control flowchart when the electromagnetic clutch 45 is turned off based on the value of the electric current of the drive motor 41.

As illustrated in FIG. 15A, when the PWM controller 61 starts control to switch the electromagnetic clutch 45 on, the PWM controller 61 gradually increases the duty cycle of the electromagnetic clutch 45 by a set increase amount $\alpha 1$ of the duty cycle per unit time (step S21). When the PWM controller 61 starts control to switch the electromagnetic clutch 45 on, the PWM controller 61 simultaneously monitors the amount of increase per unit time of the value of the electric current of the drive motor 41. When the amount of increase per unit time of the value of the electric current of the drive motor 41 exceeds a threshold (step S22), the developing torque rapidly fluctuates. Accordingly, the vibration of the driving device 40 may occur. For this reason, the increase amount of the duty cycle per unit time is decreased by $\beta 1$ (step S23). Thus, the increase amount of the duty cycle per unit time is $(\alpha 1-\beta 1)$, and the increase of the duty cycle is more gradual. As described above, the increase of the duty cycle is more gradual. Accordingly, the developing torque increases more gradually, and the occurrence of the vibration of the driving device 40 can be prevented. The controller 300 monitors the value of the electric current of the drive motor 41 and adjusts the increase amount of the duty cycle until the set duty cycle is reached (step S24).

As illustrated in FIG. 15B, when the PWM controller 61 controls to switch the electromagnetic clutch 45 off, the duty cycle of the electromagnetic clutch 45 is gradually decreased by a set decrease amount $\alpha 2$ of the duty cycle per unit time (step S31). When the amount of decrease of the value of the electric current of the drive motor 41 per unit time exceeds the threshold (step S32), the amount of decrease of the duty cycle per unit time is decreased by $\beta 2$ (step S33). Accordingly, the amount of decrease of the duty cycle per unit time is $(\alpha 2-\beta 2)$. As a result, the duty cycle decreases more gradually. As described above, the duty cycle decreases more gradually. Thus, the developing torque decreases more gradually. Accordingly, the occurrence of vibration of the driving device 40 is prevented. The controller 300 monitors the value of the electric current of the drive motor 41 and adjusts the amount of decrease of the duty cycle until the set duty cycle is zero (step S34).

The smaller the fluctuation amount of the duty cycle per unit time, the more gradual the fluctuation of the developing torque. Accordingly, the vibration of the driving device 40 can be reliably prevented. However, the smaller the fluctuation amount of the duty cycle per unit time, the longer the time to control to switch the electromagnetic clutch 45 on and off. Accordingly, when the fluctuation amount of the value of the electric current of the drive motor 41 is smaller than a predetermined value and the developing torque changes too slowly, the fluctuation amount of the duty cycle per unit time may be increased. Such a configuration as described above can prevent the time to control to switch the electromagnetic clutch 45 on and off from being prolonged to prevent a defective image such as shock jitter from being formed.

The above-described embodiments are illustrative and do not limit the embodiments of the present disclosure. Thus, numerous additional modifications and modifications are possible in light of the above teachings. For example, elements and/or features of different illustrative embodiments may be combined with each other and/or substituted for each other within the scope of the present disclosure.

For example, in the above description, the value of the electric current flowing through the electromagnetic coil 45*d* of the electromagnetic clutch 45 is changed by the PWM controller 61. However, the value of the electric current flowing through the electromagnetic coil 45*d* of the electromagnetic clutch 45 may be changed by using a variable resister.

The above-described embodiments are only examples and, for example, in the following aspects of the present disclosure, advantages described below can be obtained.

First Aspect

A drive transmitter such as a developing-drive transmitter 40*b* includes an electromagnetic clutch 45 and a controller such as the PWM controller 61. The drive transmitter transmits the driving force of a driving source such as a drive motor 41 to rotators of the developing device 4, such as the developing roller 4*a* and the developer screw 4*b*.

The controller causes the value of the electric current flowing through the electromagnetic clutch 45 to be changed in accordance with a condition of the developer G in the developing device 4.

The developer G in the developing device 4 may be thickened and firm due to, for example, a long period in which the operation of the developing device 4 is stopped. When the developer G is thickened and firm as described above, the load torque when the rotators such as the developing roller 4*a* of the developing device 4 are rotationally driven increases.

In addition, when the fluidity of the developer G is deteriorated, for example, in a high-temperature and high-humidity environment, the load torque also increases when the rotators such as the developing roller 4*a* of the developing device 4 are rotationally driven. Even when the load torque increases as described above, preferably, an electromagnetic clutch that has a strong electromagnetic force is employed as the electromagnetic clutch 45 such that the driving force can be reliably transmitted without the rotor 45*c* and the armature 45*b*, which is attracted to the rotor 45*c* of the electromagnetic clutch 45, slipping on each other.

However, when the developer G in the developing device 4 is stirred and softly spread around the developer screw 4*b* or the fluidity of the developer G is favorable, the electromagnetic force of the electromagnetic clutch 45 is excessive with respect to the load torque. The value of the electric current flowing through the electromagnetic clutch 45 increases in proportion to the electromagnetic force to be generated. For this reason, when the electromagnetic force of the electromagnetic clutch 45 is excessive with respect to the load torque as described above, the power consumption of the developing-drive transmitter 40*b* as the drive transmitter is more than necessary.

For this reason, in the first aspect, the controller changes the value of the electric current flowing through the electromagnetic clutch 45 in accordance with the condition of the developer G in the developing device 4. Accordingly, when the load torque is large with the developer G in the developing device 4 being thickened and firm or the fluidity of developer G is low, the controller increases the value of the electric current to be supplied to the electromagnetic clutch 45 to generate a strong electromagnetic force. Accordingly, the driving force can be reliably transmitted to the developing roller 4*a* of the developing device 4.

Alternatively, when the developer G is stirred and softly spread or the fluidity of developer G is high, and the driving force can be reliably transmitted to the developing screw 4*b* of the developing device 4, even if the electromagnetic force of the electromagnetic clutch 45 is weak. At this time, the PWM controller 61 reduces the value of the electric current flowing through the electromagnetic clutch 45. Accordingly, the power consumption of the developing-drive transmitter 40*b* as the drive transmission device can be reduced.

Second Aspect

In the drive transmitter according to the first aspect, the PWM controller 61 changes the value of the electric current flowing through the electromagnetic clutch 45 based on the operation stop time of the developing device 4.

As described in the first embodiment, the developer G in the developing device 4 is thickened and firm during the operation stop time of the developing device 4. Accordingly, the PWM controller 61 can grasp the condition of the developer G in the developing device 4, i.e., to what extent the developer G is thickened and firm, from the operation stop time of the developing device 4.

Then, the PWM controller 61 changes the value of the electric current flowing through the electromagnetic clutch 45 based on the operation stop time of the developing device 4. By so doing, the PWM controller 61 can change the value of the electric current flowing through the electromagnetic clutch 45 based on the condition of the developer G in the developing device 4, i.e., to what extent the developer G is thickened and firm. As a result, the driving force can be reliably transmitted to the developing roller 4*a* and the developing screw 4*b* of the developing device 4, and the power consumption of the drive transmitter can be reduced.

Third Aspect

In the drive transmitter according to the second aspect, the PWM controller 61 increases the value of the electric current flowing through the electromagnetic clutch 45 when the operation stop time of the developing device 4 exceeds a threshold.

The longer the operation stop time of the developing device 4, the more thickened and firmer the developer G in the developing device 4. Accordingly, the developing torque of the rotators such as the developing roller 4*a* and the developing screw 4*b* in the developing device 4 increases.

For this reason, when the operation stop time of the developing device 4 exceeds the threshold, the PWM controller 61 increases the value of the electric current flowing through the electromagnetic clutch 45 to increase the electromagnetic force. Accordingly, the attraction force of the armature 45*b* of the electromagnetic clutch 45 with respect to the rotor 45*c* can be increased, such that the driving force can be reliably transmitted to the developing roller 4*a* and the developing screw 4*b* of the developing device 4.

Fourth Aspect

In the drive transmitter according to any one of the first to third aspect, the PWM controller 61 changes the value of the electric current flowing through the electromagnetic clutch 45 based on the detection result of a temperature-humidity sensor such as the temperature-humidity sensor 201, which detects the temperature and humidity in the image forming apparatus 100 in which the developing device 4 is mounted.

The fluidity of the developer G is deteriorated under the high temperature and high humidity environment. For this reason, the PWM controller 61 can grasp the fluidity of the developer G from the detection result of the temperature-humidity sensor such as the temperature-humidity sensor 201.

Accordingly, the PWM controller 61 changes the value of the electric current to be supplied to the electromagnetic clutch 45 based on the detection result of the temperature-humidity sensor. By so doing, the value of the electric current to be supplied to the electromagnetic clutch 45 can be changed in accordance with the fluidity of the developer G in the developing device 4. Thus, the driving force can be reliably transmitted to the developing roller 4*a* and the developing screw 4*b* of the developing device 4, and the power consumption of the drive transmitter can be reduced.

Fifth Aspect

The drive transmitter according to a fifth aspect further includes a drive transmission device to transmit, via the electromagnetic clutch 45, the driving force of a driving source such as the drive motor 41 to a winder such as the winding roller 80, which winds the protection sheet 4*c* to protect the inside of the developing device 4 before the developing device 4 is employed. The controller causes the value of the electric current passing through the electromagnetic clutch 45 after the protection sheet 4*c* is wound to be smaller than the value of the electric current passing through the electromagnetic clutch 45 when the protection sheet 4*c* is wound.

As described in the second embodiment, when the protection sheet 4*c* is wound by the winder such as the winding roller 80, the load torque of the winder is added to the load torque of the rotators such as the developing roller 4*a* and the developing screw 4*b* of the developing device 4. When the winding of the protection sheet 4*c* is completed, the drive coupling of the protection sheet 4*c* with the winder is released. Accordingly, the load torque of the winder is not applied to the electromagnetic clutch 45.

Preferably, an electromagnetic clutch that has a strong electromagnetic force is employed as the electromagnetic clutch 45 such that the driving force can be reliably transmitted without the rotor 45*c* and the armature 45*b*, which is attracted to the rotor 45*c* of the electromagnetic clutch 45 when the protection sheet 4*c* is wound by the winder, slipping on each other.

However, during the normal developing operation that is performed after the protection sheet 4*c* is wound around the winding roller 80, the electromagnetic force of the electromagnetic clutch 45 is excessive with respect to the load torque. The value of the electric current flowing through the electromagnetic clutch 45 increases in proportion to the electromagnetic force to be generated. For this reason, when the electromagnetic force of the electromagnetic clutch 45 is excessive with respect to the load torque as described above, the power consumption of the developing-drive transmitter 40*b* as the drive transmitter is more than necessary.

Accordingly, in the fifth aspect, the value of the electric current flowing through the electromagnetic clutch 45 during the normal developing operation of the developing device 4 is set to be smaller than the value of the electric current flowing through the electromagnetic clutch 45 when the protection sheet 4*c* is wound by the winder. Accordingly, the power consumption of the drive transmitter can be reduced.

Alternatively, the value of the electric current flowing through the electromagnetic clutch 45 when the protection sheet 4*c* is wound by the winder is larger than the value of the electric current flowing through the electromagnetic clutch 45 during the normal developing operation. Accordingly, the driving force can be reliably transmitted to the developing roller 4*a* and the developing screw 4*b* of the developing device 4, and the protection sheet 4*c* can be reliably would.

Note that the normal developing operation as described above is a developing operation performed when the developer G in the developing device 4 is stirred and softly spread and the fluidity of the developer G is favorably high.

Sixth Aspect

The drive transmitter according to any one of the first to fourth aspect further includes a drive transmission device to transmit, via the electromagnetic clutch 45, the driving force of a driving source such as the drive motor 41 to a winder such as the winding roller 80, which winds the protection sheet 4*c* to protect the inside of the developing device 4 before the developing device 4 is used.

The value of the electric current flowing through the electromagnetic clutch 45 during the normal developing operation of the developing device 4 is smaller than the value of the electric current flowing through the electromagnetic clutch 45 when the protection sheet 4*c* is wound by the winder.

Accordingly, as described in the second embodiment, the power consumption of the drive transmitter during the normal developing operation can be reduced, and the protection sheet 4*c* can be reliably wound.

Note that the normal developing operation as described above is a developing operation performed when the developer G in the developing device 4 is stirred and softly spread and the fluidity of the developer G is favorably high.

Seventh Aspect

In the drive transmitter according to the fifth or sixth aspect, the drive coupling of the protection sheet 4*c* with the winder is released after the winding of the protection sheet 4*c* by the winder such as the winding roller 80 is completed.

Accordingly, as described in the second embodiment, after the winding of the protection sheet 4*c* is completed, there is no load torque of the winder such as the winding roller 80. Thus, the torque applied to the electromagnetic clutch 45 during the normal developing operation is reduced.

For this reason, even when the value of the electric current flowing through the electromagnetic clutch 45 during the normal developing operation is smaller than the value of the electric current flowing through the electromagnetic clutch 45 when the protection sheet 4*c* is wound, the armature 45*b* and the rotor 45*c* of the electromagnetic clutch 45 can be prevented from slipping on each other. Thus, the driving force can be reliably transmitted to the developing roller 4*a* and the developing screw 4*b* of the developing device 4.

Eighth Aspect

The drive transmitter according to an eighth aspect further includes gears such as the developing drive gear 44. The gear is disposed coaxially with the electromagnetic clutch 45 and assembled to a member, i.e., the clutch-drive transmitter 45*f* of the electromagnetic clutch 45 and are helical gears that generate thrust toward the electromagnetic coil 45*d* of the electromagnetic clutch 45. The value of the electric current flowing through the electromagnetic clutch 45 is gradually changed when the electromagnetic clutch 45 is switched between on and off.

As described in the third embodiment, when the value of the electric current flowing through the electromagnetic clutch 45 is instantaneously set to a predetermined current value to turn on the electromagnetic clutch 45 or when the value of the electric current flowing through the electromagnetic clutch 45 is instantaneously set to zero to turn off the electromagnetic clutch 45, the developing torque is rapidly changes and the driving device 4 vibrates. Accordingly, the vibration of the driving device 4 may cause a defective image such as shock jitter to be formed.

In the eighth aspect, the controller gradually changes the value of the electric current flowing through the electromagnetic clutch 45 when the electromagnetic clutch 45 is switched on and off. By so doing, as described in the third embodiment, the developing torque gradually changes, and the vibration of the developing device 4 can be prevented.

In addition, the gears such as the developing drive gear 44 disposed coaxially with the electromagnetic clutch 45 and assembled to a member of the electromagnetic clutch 45, i.e., the clutch-drive transmitter 45*f* and are helical gears that generate thrust toward the electromagnetic coil 45*d* of the electromagnetic clutch 45. Accordingly, the armature 45*b* can be attracted to the rotor 45*c* even when the value of the electric current flowing through the electromagnetic clutch 45 is low and the electromagnetic force is weak.

Such a configuration as described above allows the developing torque to gradually increase from the initial stage in which the electromagnetic clutch 45 is turned on, at the same time, the developing torque to gradually decreases until when the electromagnetic clutch 45 is switched off. Such a configuration as described above allows the developing torque to be further gradually changed when the electromagnetic clutch 45 is switched on and off. Thus, the occurrence of vibration of the driving device 40 can be reduced.

Ninth Aspect

In the drive transmitter according to any one of the first to seventh aspects, the PWM controller 61 gradually changes the value of the electric current flowing through the electromagnetic clutch 45, when the electromagnetic clutch 45 is switched on and off.

According to this, as described in the third embodiment, a rapid fluctuation of the developing torque can be prevented when the electromagnetic clutch 45 is switched between on and off. Accordingly, the vibration of the developing device 4 can be prevented, and the occurrence of a defective image such as a shock jitter can be prevented.

Tenth Aspect

In the drive transmission device according to any one of the first to seventh aspects and the ninth aspect, the gear such as the developing drive gear 44, which is disposed coaxially with the electromagnetic clutch 45 and is assembled to the member of the electromagnetic clutch 45 such as the clutch-drive transmitter 45*f*, is a helical gear which generates a thrust force toward the electromagnetic coil 45*d* of the electromagnetic clutch 45.

Such a configuration as described above allows, as described with reference to FIG. 3, the armature 45*b* to be pushed toward the rotor 45*c* by the thrust force of the gears such as the developing drive gear 44, and prevents a clearance between the armature 45*b* and the rotor 45*c* from being widened when the electromagnetic clutch 45 is turned off. Accordingly, foreign matters such as toner can be prevented from entering the clearance.

In addition, the metallic powder generated between the armature 45*b* and the rotor 45*c* can be held in the clearance between the rotor 45*c* and the armature 45*b* by the connection and disconnection of the electromagnetic clutch 45 to reduce the leakage of the metallic powder outside the image forming apparatus.

Further, the thrust forces assist the attraction of the armature 45*b* to the rotor 45*c*, and the value of the electric current flowing through the electromagnetic coil 45*d* can be prevented, thereby reducing the power consumption of the drive transmitter.

Eleventh Aspect

In the drive transmitter according to any one of the first to tenth aspects, the PWM controller 61 gradually changes the current value flowing to the electromagnetic clutch 45 when the electromagnetic clutch 45 is switched between on and off, and the modification per unit time of the value of the electric current flowing to the electromagnetic clutch 45 when the electromagnetic clutch 45 is switched between on and off is adjusted such that the modification per unit time of the value of the electric current flowing to the driving source such as the drive motor 41 is equal to or smaller than a threshold.

As described with reference to FIGS. 14A and 14B, the PWM controller 61 can grasp whether the developing torque gradually changes when the electromagnetic clutch 45 is switched on and off based on the fluctuation amount per unit time of the value of the electric current of the drive motor 41.

Accordingly, the controller 300 adjusts the fluctuation amount per unit of time in the value of the electric current flowing through the electromagnetic clutch 45 when the electromagnetic clutch 45 is switched between on and off, such that the value of the electric current of the drive motor 41 is equal to or smaller than the threshold value. By so doing, the fluctuation amount of the developing torque when the electromagnetic clutch 45 is switched between on and off can be made more reliably gentle, and the occurrence of vibration can be reliably prevented.

Twelfth Aspect

In the drive transmission according to any one of the first to eleventh aspects, the PWM controller 61 changes the value of the electric current flowing through the electromagnetic clutch 45 by a pulse width modulation (PWV) method.

Accordingly, the PWM controller 61 can reliably control the value of the electric current flowing through the electromagnetic clutch 45.

Thirteenth Aspect

A drive transmitter such as the driving device 40 includes a driving source such as the drive motor 41, a photoconductor-drive transmitter such as the photoconductor-drive transmitter 40*a* to transmit the driving force of the driving source to a photoconductor such as the photoconductor 2, and a developing-drive transmitter 40*b* such as the developing-drive transmitter 40*b* to transmit the driving force of the driving source to the rotators such as the developing roller 4*b* and the developing screw 4*b* of the developing device 4. The drive transmitter employs the drive transmitter according to any one of the first to twelfth aspects as the developing-drive transmitter.

Such a configuration as described above allows the power consumption of the driving device 40 to be reduced, and the driving force can be reliably transmitted to the developing roller 4*a* and the developing screw 4*b* of the developing device 4. In addition, the driving device 40 can be quieter and smaller than a device in which the photoconductor 2 and the rotators of the developing device 4 are driven by separate driving sources.

Fourteenth Aspect

An image forming apparatus includes a photoconductor such as the photoconductor 2, a developing device such as the developing device 4, and a driving device such as the driving device 40 that drives the photoconductor and the developing device. The driving device according to the thirteenth aspect is employed as the driving device for the image forming apparatus.

Accordingly, the power consumption of the image forming apparatus 100 can be reduced. At the same time, the driving force can be reliably transmitted to the rotators, i.e., the developing roller 4*a* and the developing screw 4*b* of the developing device 4.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions

The invention claimed is:

1. An image forming apparatus comprising:

a developing device including:

a developer; and a rotator to convey or stir the developer;

a drive source to generate a driving force to drive the rotator;

an electromagnetic clutch to transmit the driving force of the drive source to the rotator of the developing device; and circuitry configured to:

control current to be supplied to the electromagnetic clutch; and change a value of the current supplied to the electromagnetic clutch in accordance with a fluidity of the developer in the developing device.

2. The image forming apparatus according to claim 1, wherein the circuitry changes the value of the current supplied to the electromagnetic clutch based on an operation stop time of the developing device during which an operation of the developing device is stopped.

3. The image forming apparatus according to claim 2, wherein the circuitry increases the value of the current supplied to the electromagnetic clutch when the operation stop time of the developing device exceeds a threshold.

4. The image forming apparatus according to claim 1, further comprising a temperature-humidity sensor to detect at least one of a temperature and a humidity in the image forming apparatus, wherein the circuitry changes the value of the current supplied to the electromagnetic clutch based on a detection of the temperature or the humidity by the temperature-humidity sensor.

5. The image forming apparatus according to claim 1, further comprising:

a winder to wind a protection sheet in the developing device; and a drive transmission device to transmit, via the electromagnetic clutch, the driving force of the drive source to the winder to wind the protection sheet, wherein the circuitry is further configured to:

set a first value of the current supplied to the electromagnetic clutch during a developing operation of the developing device; and set a second value of the current supplied to the electromagnetic clutch when the winder winds the protection sheet, the second value larger than the first value.

6. The image forming apparatus according to claim 5, wherein the winder releases the protection sheet after the winder completes winding the protection sheet.

7. The image forming apparatus according to claim 1, wherein the circuitry is further configured to gradually change the value of the current supplied to the electromagnetic clutch when the electromagnetic clutch is switched between on and off.

8. The image forming apparatus according to claim 1, further comprising:

a helical gear coaxial with the electromagnetic clutch and assembled to the electromagnetic clutch, wherein the electromagnetic clutch includes an electromagnetic coil, and the helical gear generates a thrust force toward the electromagnetic coil of the electromagnetic clutch.

9. The image forming apparatus according to claim 1, wherein the circuitry is further configured to:

gradually change the value of the current supplied to the electromagnetic clutch when the electromagnetic clutch is switched between on and off; and adjust a fluctuation amount per unit time of the value of the current supplied to the electromagnetic clutch to be equal to or smaller than a threshold when the electromagnetic clutch is switched between on and off.

10. The image forming apparatus according to claim 1, wherein the circuitry controls a pulse width modulation to change the value of the current supplied to the electromagnetic clutch.

11. The image forming apparatus according to claim 1, further comprising:

a photoconductor;

a photoconductor-drive transmitter to transmit the driving force of the drive source to the photoconductor; and a developing-drive transmitter to transmit the driving force of the drive source to the rotator of the developing device.

12. The image forming apparatus according to claim 1, further comprising:

a photoconductor; and a driver to drive the photoconductor and the developing device.

13. An image forming apparatus comprising:

a developing device including:

a developer; and a rotator to convey or stir the developer;

a drive source to generate a driving force to drive the rotator;

an electromagnetic clutch to transmit the driving force of the drive source to the rotator of the developing device;

a winder to wind a protection sheet in the developing device;

a drive transmission device to transmit, via the electromagnetic clutch, the driving force of the drive source to the winder to wind the protection sheet; and circuitry configured to:

set a first value of a current supplied to the electromagnetic clutch during a developing operation of the developing device; and set a second value of the current supplied to the electromagnetic clutch when the winder winds the protection sheet, the second value larger than the first value.

14. The image forming apparatus according to claim 13, wherein the winder releases the protection sheet after the winder completes winding the protection sheet.

15. The image forming apparatus according to claim 13, wherein the circuitry is further configured to gradually change a value of the current supplied to the electromagnetic clutch when the electromagnetic clutch is switched between on and off.

16. The image forming apparatus according to claim 13, further comprising a helical gear coaxial with the electromagnetic clutch and assembled to the electromagnetic clutch, wherein the electromagnetic clutch includes an electromagnetic coil, and the helical gear generates a thrust force toward the electromagnetic coil of the electromagnetic clutch.

17. The image forming apparatus according to claim 13, wherein the circuitry controls a pulse width modulation to change a value of the current supplied to the electromagnetic clutch.

18. An image forming apparatus comprising:

an electromagnetic clutch including an electromagnetic coil;

a drive source to drive the electromagnetic clutch;

a helical gear coaxial with the electromagnetic clutch and assembled to the electromagnetic clutch, the helical gear to generate a thrust force to move the helical gear toward the electromagnetic coil of the electromagnetic clutch; and circuitry configured to gradually change a value of a current supplied to the electromagnetic clutch when the electromagnetic clutch is switched between on and off.

19. The image forming apparatus according to claim 18, wherein the circuitry controls a pulse width modulation to change the value of the current supplied to the electromagnetic clutch.

* * * * *